US011147065B2

(12) United States Patent
Wang et al.

(10) Patent No.: US 11,147,065 B2
(45) Date of Patent: Oct. 12, 2021

(54) FEEDBACK BIT RESERVATION FOR UPLINK CONTROL PIGGYBACKING

(71) Applicant: QUALCOMM Incorporated, San Diego, CA (US)

(72) Inventors: Renqiu Wang, San Diego, CA (US); Yi Huang, San Diego, CA (US); Sanghoon Kim, Saratoga, CA (US); Amir Aminzadeh Gohari, Sunnyvale, CA (US); Peter Gaal, San Diego, CA (US); Wanshi Chen, San Diego, CA (US); Tingfang Ji, San Diego, CA (US); Sony Akkarakaran, Poway, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/252,939

(22) Filed: Jan. 21, 2019

(65) Prior Publication Data

US 2019/0230655 A1 Jul. 25, 2019

Related U.S. Application Data

(60) Provisional application No. 62/620,445, filed on Jan. 22, 2018, provisional application No. 62/710,475, filed on Feb. 16, 2018.

(51) Int. Cl.
*H04W 72/04* (2009.01)
*H04L 1/18* (2006.01)
(Continued)

(52) U.S. Cl.
CPC ....... *H04W 72/0446* (2013.01); *H04L 1/0026* (2013.01); *H04L 1/0072* (2013.01);
(Continued)

(58) Field of Classification Search
None
See application file for complete search history.

(56) References Cited

U.S. PATENT DOCUMENTS

| 2011/0038302 A1* | 2/2011 | Papasakellariou .. H04W 72/042 370/315 |
| 2013/0094479 A1* | 4/2013 | Park ...................... H04L 1/0027 370/336 |

(Continued)

OTHER PUBLICATIONS

Nokia, "Remaining Details on UCI Multiplexing", document R1-1800560 submitted in the IDS (Year: 2018).*

(Continued)

*Primary Examiner* — Jamaal Henson
(74) *Attorney, Agent, or Firm* — Holland & Hart LLP/Qualcomm

(57) ABSTRACT

A wireless device may identify a set of resources reserved for feedback information (e.g., resource elements (REs) reserved for feedback such as acknowledgement (ACK) or negative ACK (NACK) information) within a transmission time interval (TTI). Feedback information may be mapped to the reserved set of resources (e.g., reserved REs). The wireless device may determine a set of unused reserved resources (e.g., a set of unused reserved REs) based on the number of feedback bits. The wireless device may then map other bits (e.g., zeros, known bits, pattern or sequence of bits, random bits, etc.) to the set of unused reserved REs, or boost transmission power of bits mapped around the unused reserved REs. In some cases, the number of reserved REs may be determined based on the number of feedback bits (e.g., the size of the ACK/NACK payload). The wireless device may then transmit the information to a base station.

30 Claims, 18 Drawing Sheets

(51) Int. Cl.
*H04L 1/16* (2006.01)
*H04L 1/00* (2006.01)
*H04L 5/00* (2006.01)
*H04W 76/28* (2018.01)

(52) U.S. Cl.
CPC .......... *H04L 1/1671* (2013.01); *H04L 1/1861* (2013.01); *H04L 5/0046* (2013.01); *H04L 5/0055* (2013.01); *H04L 5/0057* (2013.01); *H04W 76/28* (2018.02)

(56) References Cited

U.S. PATENT DOCUMENTS

| | | | | |
|---|---|---|---|---|
| 2018/0110041 | A1* | 4/2018 | Bendlin | H04L 27/2613 |
| 2018/0132230 | A1* | 5/2018 | Han | H04L 1/1861 |
| 2018/0324787 | A1* | 11/2018 | Yin | H04L 1/1861 |
| 2018/0332569 | A1* | 11/2018 | Golitschek Edler von Elbwart | H04L 5/0044 |
| 2019/0116588 | A1* | 4/2019 | Xiong | H04L 5/0007 |
| 2019/0149266 | A1* | 5/2019 | Dikarev | H04L 1/0029 370/329 |
| 2019/0233184 | A1* | 8/2019 | Arminak | B65D 50/041 |
| 2020/0059327 | A1* | 2/2020 | Kini | H04W 72/042 |

OTHER PUBLICATIONS

Intel, "On the Reserved HARQ-ACK REs", R1-1800329, Jan. 2018. (Year: 2018).*
Nokia, "Remaining Details on UCI Multiplexing", R1-1800560 (Year: 2018).*
Intel, "On the Reserved HARQ-ACK REs", R1-1800329 (Year: 2018).*
"On the Reserved HARQ-ACK REs", R1-1800329, Jan. 2018 (Year: 2018).*
Nokia, "Remaining Details on UCI Multiplexing", document R1-1800560 (Year: 2018).*
Intel Corporation: "On the Reserved HARQ-ACK REs", 3GPP Draft, R1-1800329 Intel Reserved HARQ-ACK RES, 3RD Generation Partnership Project (3GPP), Mobile Competence Centre , 650, Route Des Lucioles , F-06921 Sophia-Antipolis Cedex , France, vol. RAN WG1, No. Vancouver, Canada, 20180122-20180126, Jan. 13, 2018 (Jan. 13, 2018), XP051384788, 4 Pages, Retrieved from the Internet: URL:http://www.3gpp.org/ftp/tsg%5Fran/WG1%5FRL1/TSGR1%5FAH/NR%5FAH%5F1801/Docs/ [retrieved on Jan. 13, 2018].
International Search Report and Written Opinion—PCT/US2019/014611—ISA/EPO—dated Apr. 29, 2019.
Nokia et al., "Remaining Details on UCI Multiplexing", 3GPP Draft, R1-1800560_UCI_MUX, 3RD Generation Partnership Project (3GPP), Mobile Competence Centre , 650, Route Des Lucioles , F-06921 Sophia-Antipolis Cedex , France, vol. RAN WG1, No. Vancouver, Canada, 20180122-20180126, Jan. 12, 2018 (Jan. 12, 2018), XP051384471, 5 Pages, Retrieved from the Internet: URL:http://www.3gpp.org/ftp/tsg%5Fran/WG1%5FRL1/TSGR1%5FAH/NR%5FAH%5F1801/Docs/ [retrieved on Jan. 12, 2018].
Nokia et al., "UL ACK/NAK Feedback for Non-Power-Limited UE in LTE-A TDD", 3GPP Draft, R1-103784, 3RD Generation Partnership Project (3GPP), Mobile Competence Centre, 650, Route Des Lucioles, F-06921 Sophia-Antipolis Cedex, France, vol. RAN WG1, No. Dresden, Germany, 20100628, Jun. 22, 2010 (Jun. 22, 2010), XP050449211, 5 Pages, [retrieved on Jun. 22, 2010].

* cited by examiner

FEEDBACK BIT RESERVATION FOR UPLINK CONTROL PIGGYBACKING

CROSS REFERENCES

The present Application for Patent claims the benefit of U.S. Provisional Patent Application No. 62/620,445 by Wang, et al., entitled "Feedback Bit Reservation For Uplink Control Piggybacking," filed Jan. 22, 2018, and to U.S. Provisional Patent Application No. 62/710,475 by Wang, et al., entitled "Feedback Bit Reservation For Uplink Control Piggybacking" filed Feb. 16, 2018, assigned to the assignee hereof, and expressly incorporated herein.

BACKGROUND

The following relates generally to wireless communications, and more specifically to feedback bit reservation for uplink control piggybacking.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A UE may send uplink control information (UCI) to inform a serving base station about conditions of a wireless channel and other control information for managing communication over the wireless channel. UCI may include different types of information, such as hybrid automatic repeat request (HARD) feedback, channel state information (CSI), etc. In some cases, the UE may transmit UCI via a control channel (e.g., a physical uplink control channel (PUCCH)) or a shared data channel (e.g., UCI may be piggybacked (e.g., multiplexed) on a physical uplink shared channel (PUSCH)).

In some examples, a base station may send a grant allocating resources of a PUSCH to the UE for sending UCI piggybacked on the PUSCH payload. Improved techniques for efficient PUSCH utilization may be desired.

SUMMARY

The described techniques relate to improved methods, systems, devices, or apparatuses that support feedback bit reservation for uplink control piggybacking. A wireless device (e.g., a user equipment (UE)) may identify a set of resources reserved for feedback information (e.g., resource elements (REs) reserved for hybrid automatic repeat request (HARQ) feedback such as acknowledgement (ACK) or negative ACK (NACK) information) within a transmission time interval (TTI). Feedback information may be mapped to the reserved set of resources (e.g., reserved REs). The wireless device may determine a set of unused reserved resources (e.g., a set of unused reserved REs) based on the number of feedback bits. The wireless device may map other bits (e.g., digital zeros, known bits, a known pattern or sequence of bits, random bits, other channel state information (CSI) bits, etc.) to the set of unused reserved REs, or the wireless device may boost transmission power of bits mapped around the unused reserved REs (e.g., fill analog zeros to the symbol duration including the unused reserved REs). In some cases, the number of reserved REs may be determined based on the number of feedback bits (e.g., the size of the HARQ-ACK/NACK payload). In some examples, some CSI information may be mapped to resources and transmitted even in instances where an effective code rate of the CSI information is less than a maximum code rate for the CSI information. The wireless device may then transmit the information (e.g., piggybacked with a physical uplink shared channel (PUSCH) payload if any) to a base station.

A method of wireless communications is described. The method may include identifying a set of resources reserved for feedback information within a TTI, mapping a number of feedback bits for transmission to a base station to the set of resources reserved for feedback information, determining a set of unused resources of the set of resources reserved for feedback information based at least in part on the number of feedback bits, mapping a number of bits to the set of unused resources, and transmitting, to the base station, the mapped number of feedback bits and the mapped number of bits via the set of resources reserved for feedback information.

An apparatus for wireless communications is described. The apparatus may include means for identifying a set of resources reserved for feedback information within a TTI, means for mapping a number of feedback bits for transmission to a base station to the set of resources reserved for feedback information, means for determining a set of unused resources of the set of resources reserved for feedback information based at least in part on the number of feedback bits, means for mapping a number of bits to the set of unused resources, and means for transmitting, to the base station, the mapped number of feedback bits and the mapped number of bits via the set of resources reserved for feedback information.

Another apparatus for wireless communications is described. The apparatus may include a processor, memory in electronic communication with the processor, and instructions stored in the memory. The instructions may be operable to cause the processor to identify a set of resources reserved for feedback information within a TTI, map a number of feedback bits for transmission to a base station to the set of resources reserved for feedback information, determine a set of unused resources of the set of resources reserved for feedback information based at least in part on the number of feedback bits, map a number of bits to the set of unused resources, and transmit, to the base station, the mapped number of feedback bits and the mapped number of bits via the set of resources reserved for feedback information.

A non-transitory computer-readable medium for wireless communications is described. The non-transitory computer-readable medium may include instructions operable to cause a processor to identify a set of resources reserved for feedback information within a TTI, map a number of feedback bits for transmission to a base station to the set of resources reserved for feedback information, determine a set of unused resources of the set of resources reserved for feedback information based at least in part on the number of feedback bits, map a number of bits to the set of unused resources, and transmit, to the base station, the mapped number of feedback bits and the mapped number of bits via the set of resources reserved for feedback information.

In some examples of the method, apparatus, and non-transitory computer-readable medium described above, mapping the number of bits to the set of unused resources includes filling the set of unused resources with a predetermined pattern of bits. In some examples of the method, apparatus, and non-transitory computer-readable medium described above, the predetermined pattern of bits includes a sequence of bits that may be different from an ACK sequence, a NACK sequence, or any combination thereof. In some examples of the method, apparatus, and non-transitory computer-readable medium described above, the sequence may be different from each of a one bit ACK sequence, a one bit NACK sequence, a permutation of the one bit ACK sequence and the one bit NACK sequence, a two bit ACK sequence, and a two bit NACK sequence.

Some examples of the method, apparatus, and non-transitory computer-readable medium described above may further include processes, features, means, or instructions for scrambling the predetermined pattern of bits using a cell-specific identifier. Some examples of the method, apparatus, and non-transitory computer-readable medium described above may further include processes, features, means, or instructions for filling the set of unused resources with the scrambled predetermined pattern of bits. In some examples of the method, apparatus, and non-transitory computer-readable medium described above, the predetermined pattern of bits may be used for discontinuous transmission (DTX) detection.

In some examples of the method, apparatus, and non-transitory computer-readable medium described above, mapping the number of bits to the set of unused resources includes filling the set of unused resources with a random pattern of bits. Some examples of the method, apparatus, and non-transitory computer-readable medium described above may further include processes, features, means, or instructions for scrambling the random pattern of bits using a cell-specific identifier. Some examples of the method, apparatus, and non-transitory computer-readable medium described above may further include processes, features, means, or instructions for filling the set of unused resources with the scrambled random pattern of bits. In some examples of the method, apparatus, and non-transitory computer-readable medium described above, the random pattern of bits may be used for DTX detection.

In some examples of the method, apparatus, and non-transitory computer-readable medium described above, mapping the number of bits to the set of unused resources includes mapping a first part of CSI bits to the set of unused resources. Some examples of the method, apparatus, and non-transitory computer-readable medium described above may further include processes, features, means, or instructions for repeating the mapping of the first part of CSI bits to resources around the set of unused resources. In some examples of the method, apparatus, and non-transitory computer-readable medium described above, the first part of CSI bits mapped to the set of unused resources includes a reduced payload of CSI bits. In some examples of the method, apparatus, and non-transitory computer-readable medium described above, the reduced payload of CSI bits corresponds to a RI and a CRI.

In some examples of the method, apparatus, and non-transitory computer-readable medium described above, the number of feedback bits for transmission to the base station may be zero.

In some examples of the method, apparatus, and non-transitory computer-readable medium described above, mapping the number of bits to the set of unused resources includes filling the set of unused resources with a set of predetermined digital bits. In some examples of the method, apparatus, and non-transitory computer-readable medium described above, the set of predetermined digital bits includes a set of zeros, a set of pseudo random bits, or a set of known bits.

Some examples of the method, apparatus, and non-transitory computer-readable medium described above may further include processes, features, means, or instructions for boosting a transmission power of bits mapped around the set of resources reserved for feedback information. In some examples of the method, apparatus, and non-transitory computer-readable medium described above, the transmission power may be boosted based at least in part on the set of unused resources.

In some examples of the method, apparatus, and non-transitory computer-readable medium described above, mapping the number of bits to the set of unused resources includes filling the set of unused resources with a set of CSI bits. In some examples of the method, apparatus, and non-transitory computer-readable medium described above, the set of CSI bits includes a first part of CSI bits.

In some examples of the method, apparatus, and non-transitory computer-readable medium described above, the number of feedback bits for transmission to the base station may be one.

Some examples of the method, apparatus, and non-transitory computer-readable medium described above may further include processes, features, means, or instructions for repeating a set of information feedback bits prior to mapping, where the repeated set of information feedback bits may be mapped to an entirety of the set of resources reserved for feedback information. Some examples of the method, apparatus, and non-transitory computer-readable medium described above may further include processes, features, means, or instructions for encoding the repeated set of information feedback bits prior to mapping. In some examples of the method, apparatus, and non-transitory computer-readable medium described above, the repeated set of information feedback bits may be encoded based at least in part on a simplex code.

Some examples of the method, apparatus, and non-transitory computer-readable medium described above may further include processes, features, means, or instructions for repeating a set of encoded feedback bits prior to mapping, where the repeated set of encoded feedback bits may be mapped to an entirety of the set of resources reserved for feedback information. Some examples of the method, apparatus, and non-transitory computer-readable medium described above may further include processes, features, means, or instructions for encoding the number of feedback bits based at least in part on a repetition code. Some examples of the method, apparatus, and non-transitory computer-readable medium described above may further include processes, features, means, or instructions for rate-matching the encoded number of feedback bits to the set of resources reserved for feedback information.

In some examples of the method, apparatus, and non-transitory computer-readable medium described above, mapping the number of bits to the set of unused resources includes filling the set of unused resources with a set of predetermined digital bits. In some examples of the method, apparatus, and non-transitory computer-readable medium described above, the set of predetermined digital bits includes a set of zeros, a set of random bits, or a set of known bits.

Some examples of the method, apparatus, and non-transitory computer-readable medium described above may further include processes, features, means, or instructions for boosting a transmission power of bits mapped around the set of resources reserved for feedback information. In some examples of the method, apparatus, and non-transitory computer-readable medium described above, the transmission power may be boosted based at least in part on the set of unused resources.

In some examples of the method, apparatus, and non-transitory computer-readable medium described above, mapping the number of bits to the set of unused resources includes filling the set of unused resources with a set of CSI bits. In some examples of the method, apparatus, and non-transitory computer-readable medium described above, the set of CSI bits includes a first part of CSI bits.

Some examples of the method, apparatus, and non-transitory computer-readable medium described above may further include processes, features, means, or instructions for receiving, from the base station, a control channel message that includes a downlink assignment index (DAI), where the set of resources reserved for feedback information may be identified based at least in part on the DAI.

In some examples of the method, apparatus, and non-transitory computer-readable medium described above, the set of resources reserved for feedback information includes a set of REs within a symbol of the TTI.

A method of wireless communications is described. The method may include mapping a first part of CSI bits to a first set of resources within a TTI, determining a code rate for a second part of CSI bits, mapping at least a portion of the second part of CSI bits to a second set of resources within the TTI based at least in part on a comparison of the code rate and a maximum code rate for the second part of CSI bits, and transmitting at least the portion of the second part of CSI bits to the base station based at least in part on the mapping.

An apparatus for wireless communications is described. The apparatus may include means for mapping a first part of CSI bits to a first set of resources within a TTI, means for determining a code rate for a second part of CSI bits, means for mapping at least a portion of the second part of CSI bits to a second set of resources within the TTI based at least in part on a comparison of the code rate and a maximum code rate for the second part of CSI bits, and means for transmitting at least the portion of the second part of CSI bits to the base station based at least in part on the mapping.

Another apparatus for wireless communications is described. The apparatus may include a processor, memory in electronic communication with the processor, and instructions stored in the memory. The instructions may be operable to cause the processor to map a first part of CSI bits to a first set of resources within a TTI, determine a code rate for a second part of CSI bits, map at least a portion of the second part of CSI bits to a second set of resources within the TTI based at least in part on a comparison of the code rate and a maximum code rate for the second part of CSI bits, and transmit at least the portion of the second part of CSI bits to the base station based at least in part on the mapping.

A non-transitory computer-readable medium for wireless communications is described. The non-transitory computer-readable medium may include instructions operable to cause a processor to map a first part of CSI bits to a first set of resources within a TTI, determine a code rate for a second part of CSI bits, map at least a portion of the second part of CSI bits to a second set of resources within the TTI based at least in part on a comparison of the code rate and a maximum code rate for the second part of CSI bits, and transmit at least the portion of the second part of CSI bits to the base station based at least in part on the mapping.

Some examples of the method, apparatus, and non-transitory computer-readable medium described above may further include processes, features, means, or instructions for dropping a first portion of the second part of CSI bits based at least in part on the comparison of the code rate and the maximum code rate. Some examples of the method, apparatus, and non-transitory computer-readable medium described above may further include processes, features, means, or instructions for determining that an effective code rate for a second portion of the second part of CSI bits exceeds the maximum code rate. Some examples of the method, apparatus, and non-transitory computer-readable medium described above may further include processes, features, means, or instructions for mapping the second portion of the second part of CSI bits to the second set of resources allocated for the second part of CSI bits. Some examples of the method, apparatus, and non-transitory computer-readable medium described above may further include processes, features, means, or instructions for transmitting the mapped second portion of the second part of CSI bits to the base station.

In some examples of the method, apparatus, and non-transitory computer-readable medium described above, the second portion of the second part of CSI bits excludes the first portion of the second part of CSI bits. In some examples of the method, apparatus, and non-transitory computer-readable medium described above, at least the portion of the second part of CSI bits may be mapped to a set of resources reserved for feedback information.

A method of wireless communications is described. The method may include identifying a set of resources reserved for feedback information within a TTI, receiving, from a UE, a pattern of bits via the set of resources reserved for feedback information, where the pattern of bits includes a sequence of bits that is different from an ACK sequence, a NACK sequence, or a combination thereof, and detecting DTX for the UE based at least in part on the pattern of bits.

An apparatus for wireless communications is described. The apparatus may include means for identifying a set of resources reserved for feedback information within a TTI, means for receiving, from a UE, a pattern of bits via the set of resources reserved for feedback information, where the pattern of bits includes a sequence of bits that is different from an ACK sequence, a NACK sequence, or a combination thereof, and means for detecting DTX for the UE based at least in part on the pattern of bits.

Another apparatus for wireless communications is described. The apparatus may include a processor, memory in electronic communication with the processor, and instructions stored in the memory. The instructions may be operable to cause the processor to identify a set of resources reserved for feedback information within a TTI, receive, from a UE, a pattern of bits via the set of resources reserved for feedback information, where the pattern of bits includes a sequence of bits that is different from an ACK sequence, a NACK sequence, or a combination thereof, and detect DTX for the UE based at least in part on the pattern of bits.

A non-transitory computer-readable medium for wireless communications is described. The non-transitory computer-readable medium may include instructions operable to cause a processor to identify a set of resources reserved for feedback information within a TTI, receive, from a UE, a pattern of bits via the set of resources reserved for feedback information, where the pattern of bits includes a sequence of bits that is different from an ACK sequence, a NACK sequence, or a combination thereof, and detect DTX for the UE based at least in part on the pattern of bits.

In some examples of the method, apparatus, and non-transitory computer-readable medium described above, the pattern of bits includes a predetermined pattern of bits or a random pattern of bits.

In some examples of the method, apparatus, and non-transitory computer-readable medium described above, the sequence may be different from each of a one bit ACK sequence, a one bit NACK sequence, a permutation of the one bit ACK sequence and the one bit NACK sequence, a two bit ACK sequence, and a two bit NACK sequence.

Some examples of the method, apparatus, and non-transitory computer-readable medium described above may further include processes, features, means, or instructions for transmitting a downlink message to the UE, where the pattern of bits may be received in response to the downlink message. Some examples of the method, apparatus, and non-transitory computer-readable medium described above may further include processes, features, means, or instructions for determining a NACK response to the downlink message based at least in part on the detection of DTX.

A method of wireless communications is described. The method may include identifying a number of feedback bits for transmission within a TTI to a base station, reserving a set of resources for the number of feedback bits based at least in part on a size of the number of feedback bits, mapping the number of feedback bits to the reserved set of resources, and transmitting the mapped number of feedback bits to the base station.

An apparatus for wireless communications is described. The apparatus may include means for identifying a number of feedback bits for transmission within a TTI to a base station, means for reserving a set of resources for the number of feedback bits based at least in part on a size of the number of feedback bits, means for mapping the number of feedback bits to the reserved set of resources, and means for transmitting the mapped number of feedback bits to the base station.

Another apparatus for wireless communications is described. The apparatus may include a processor, memory in electronic communication with the processor, and instructions stored in the memory. The instructions may be operable to cause the processor to identify a number of feedback bits for transmission within a TTI to a base station, reserve a set of resources for the number of feedback bits based at least in part on a size of the number of feedback bits, map the number of feedback bits to the reserved set of resources, and transmit the mapped number of feedback bits to the base station.

A non-transitory computer-readable medium for wireless communications is described. The non-transitory computer-readable medium may include instructions operable to cause a processor to identify a number of feedback bits for transmission within a TTI to a base station, reserve a set of resources for the number of feedback bits based at least in part on a size of the number of feedback bits, map the number of feedback bits to the reserved set of resources, and transmit the mapped number of feedback bits to the base station.

In some examples of the method, apparatus, and non-transitory computer-readable medium described above, the size of the number of feedback bits may be based at least in part on a payload size for a set of HARQ bits.

Some examples of the method, apparatus, and non-transitory computer-readable medium described above may further include processes, features, means, or instructions for mapping CSI bits around the set of resources reserved for the number of feedback bits. Some examples of the method, apparatus, and non-transitory computer-readable medium described above may further include processes, features, means, or instructions for transmitting, to the base station, the mapped CSI bits.

Some examples of the method, apparatus, and non-transitory computer-readable medium described above may further include processes, features, means, or instructions for multiplexing a set of shared data bits with the mapped number of feedback bits. Some examples of the method, apparatus, and non-transitory computer-readable medium described above may further include processes, features, means, or instructions for transmitting the multiplexed set of shared data bits and the mapped number of feedback bits via a physical uplink shared channel (PUSCH). In some examples of the method, apparatus, and non-transitory computer-readable medium described above, the TTI includes resources of a PUSCH.

DETAILED DESCRIPTION

Figure 1:
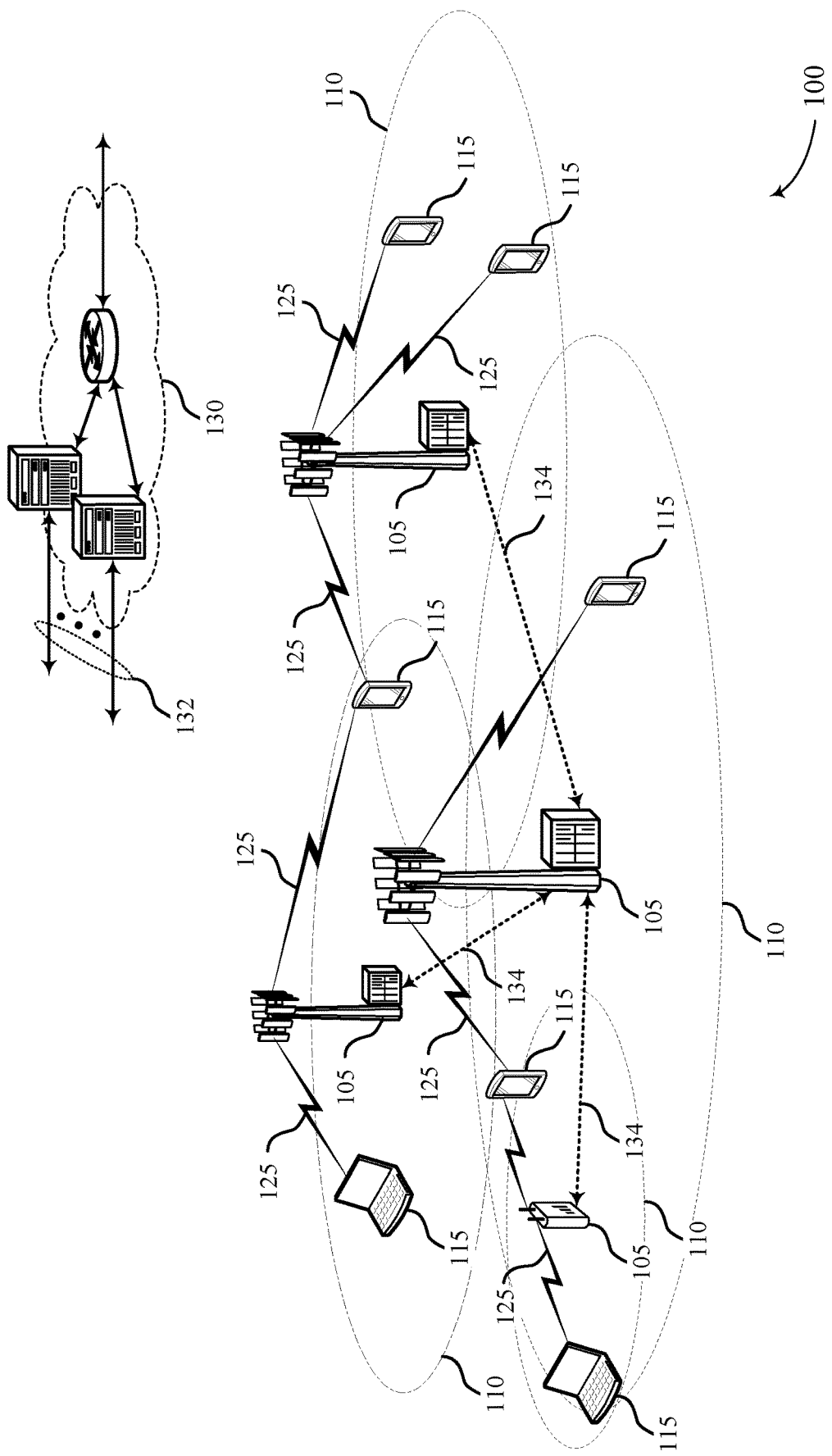
FIG. 1 illustrates an example of a wireless communications system that supports feedback bit reservation for uplink control piggybacking in accordance with aspects of the present disclosure.

The described techniques relate to improved methods, systems, devices, or apparatuses that support feedback bit reservation for uplink control piggybacking. A wireless device (e.g., a user equipment (UE)) may piggy back uplink control information (UCI) on a physical uplink shared channel (PUSCH) such that control information may be transmitted with data. In such cases, resources (e.g., resource elements (REs)) within the PUSCH may be reserved for feedback information (e.g., hybrid automatic repeat request acknowledgements (HARD) feedback such as acknowledgement (ACK) or negative ACK (NACK) information). That is, a UE may identify a set of resources reserved for feedback information (e.g., REs reserved for HARQ-ACK/NACK) within a transmission time interval (TTI). Feedback information may be mapped to the reserved set of resources (e.g., reserved REs). The wireless device may determine a set of unused reserved resources (e.g., a set of unused reserved REs) based on the number of feedback bits. The wireless device may then map other bits (e.g., digital zeros, known bits, random bits, a pattern or sequence of bits, other channel state information bits, etc.) to the set of unused reserved REs, or the wireless device may boost transmission power of bits mapped around the unused reserved REs (e.g., fill analog zeros to the symbol duration including the unused reserved REs). In some cases, the number of reserved REs may be determined based on the number of feedback bits (e.g., the size of the HARQ-ACK/NACK payload). The wireless device may then transmit the information (e.g., the PUSCH) to a base station. Beneficially, the techniques described herein may result in improved PUSCH utilization, and provide a solution for unused or empty reserved REs in PUSCH transmissions (e.g., which may rectify undesirable power spectral density (PSD) differences across symbol durations of a resource block or PUSCH transmission.

In an example, a base station may transmit downlink signaling that includes a grant indicating an uplink resource allocation to a UE. The grant may allocate one or more resource blocks to the UE for an uplink transmission (e.g., a transmission in a PUSCH). Each resource block may correspond to a set of REs. PUSCH information (e.g., channel state information (CSI), HARQ feedback, PUSCH data, etc.) may be mapped to REs within a transmission duration (e.g., a transmission time interval (TTI)).

In some examples, CSI may include different parts, and the UE may send the one or more CSI parts in a PUSCH transmission within the one or more allocated resource blocks. For example, CSI part 1 may include one or more of a rank indicator (RI), CSI resource indicator (CRI), a channel quality indicator (CQI) for a first continuous wave (CW), or the like, or any combination thereof. CSI part 2 may include Precoding Matrix Indicator (PMI), CQI for a second CW such as wideband and sub-band signaling, or the like, or any combination thereof. In some cases, the CSI part 2 may include wideband CQI, subband CQI, or both. Wideband CQI may be CQI corresponding to a bandwidth range in which frequency resources may be allocated to the UE for an uplink transmission.

In some cases, such CSI may be associated with different relevance or priority (e.g., CSI part 1 may be prioritized over CSI part 2). As discussed in more detail below, REs reserved for feedback information (e.g., reserved REs for HARQ-ACK/NACK) may be selected and mapped to in accordance with such priorities. For example, reserved REs may be included if PUSCH may be punctured by ACK bits. Reserved REs may be mapped following mapping of PUSCH DMRS REs. CSI part 1 may then be mapped to CSI part 1 REs following mapping of reserved REs. CSI part 2 may then be mapped to CSI part 2 REs and PUSCH data may be mapped to PUSCH data REs.

A maximum code rate for CSI part 2 may be identified or determined and if the code rate for CSI part 2 information exceeds the maximum code rate, one or more portions of CSI part 2 may be dropped. In some cases, after dropping one or more portions of CSI part 2, the effective code rate of the remaining portion(s) of CSI part 2 may still exceed the maximum code rate for CSI part 2 (e.g., when an insufficient number of REs are allocated for CSI part 2). In such instances, although the effective code rate exceeds the maximum code rate, the remaining portion(s) of CSI part 2 may still be mapped (e.g., to resource allocated for CSI part 2 or reserved for feedback) and transmitted by the UE.

Aspects of the disclosure are initially described in the context of a wireless communications system. Aspects of the disclosure are further illustrated by and described with reference to an example transmission, process flows, apparatus diagrams, system diagrams, and flowcharts that relate to feedback bit reservation for uplink control piggybacking.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved Universal Terrestrial Radio Access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as orthogonal frequency division multiplexing (OFDM) or discrete Fourier transform-spread-OFDM (DFT-S-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

A UE 115 and a base station 105 may establish a connection for exchanging uplink and downlink transmissions. The UE 115 and the base station 105 provide acknowledgement feedback to let one another know whether a transmission passed error detection or if a prior transmission should be retransmitted. For uplink transmissions, the base station 105 may grant the UE 115 resources within an uplink shared channel (e.g., a PUSCH), and the UE 115 may piggyback UCI, such as ACK/NACK data, CSI data, or the like, on a transmission sent within the allocated PUSCH resources.

Figure 2:
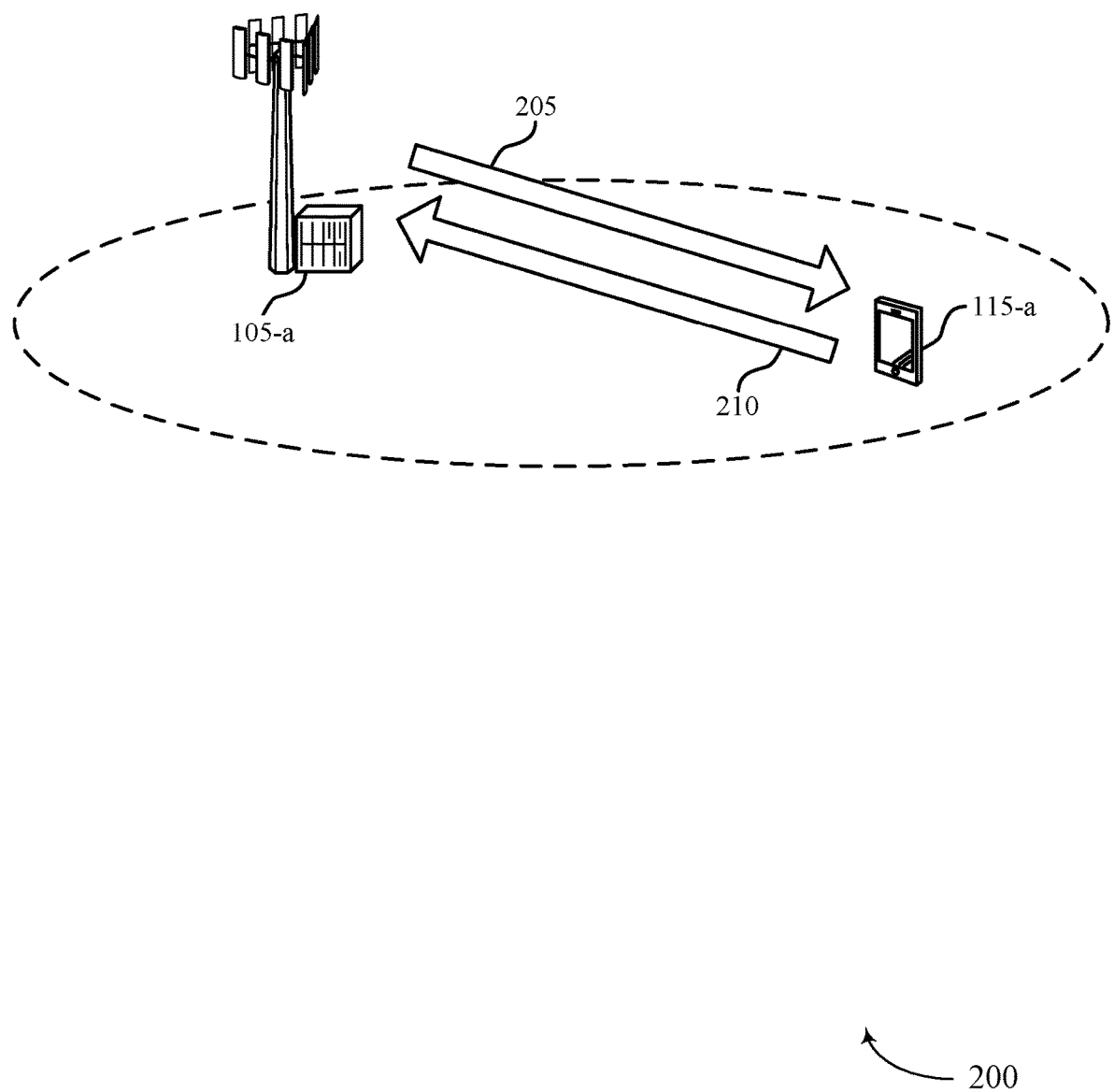
FIG. 2 illustrates an example of a wireless communications system that supports feedback bit reservation for uplink control piggybacking in accordance with aspects of the present disclosure.

FIG. 2 illustrates an example of a wireless communications system 200 that supports feedback bit reservation for uplink control piggybacking in accordance with various aspects of the present disclosure. In some examples, wireless communications system 200 may implement aspects of wireless communications system 100. For example, wireless communications system 200 includes UE 115-a and base station 105-a, which may be examples of the corresponding devices described with reference to FIG. 1. Wireless communications system 200 may support piggybacking UCI and/or CSI on a PUSCH transmission.

UE 115-a may receive downlink signaling 205 from the base station 105-a, and transmit uplink signaling 210 to the base station 105-b. In some examples, downlink signaling 205 may include an uplink resource grant of resources within the uplink shared channel (e.g., a PUSCH grant), and uplink signaling 210 may include PUSCH transmissions. The grant (e.g., downlink signaling 205) may indicate time and frequency resources allocated for an uplink transmission (e.g., uplink signaling 210) that may span a set of OFDM symbols and a bandwidth that spans a set of subcarriers. In an example, the grant may identify a set of one or more resource blocks for an uplink transmission, and each of the resource blocks may include a set of resource elements. Each resource element may correspond to a single subcarrier (e.g., a tone) and a single OFDM symbol. In some cases, UE 115-a may process the grant to determine some or none of the RE allocation for the PUSCH transmission.

In some examples, UE 115-a may receive a grant (e.g., via downlink signaling 205) for multiple downlink transmissions over multiple slots and/or via multiple CCs. The UE 115-a may provide feedback for each downlink transmission (e.g., for each slot of each CC) by generating a set of feedback bits (e.g., HARQ-ACK/NACK information) and transmitting the set of feedback bits over a single CC and/or within a single slot of PUSCH resources. In this manner, the UE 115-a may generate a feedback bit for each downlink transmission or may provide an aggregate of feedback bits such that if one downlink transmission of a set of downlink transmissions was unsuccessfully received, the UE 115-a would transmit a NACK in response. Alternatively, UE 115-a may not receive the set of downlink transmissions and may not send HARQ-ACK/NACK in response. For instance, the UE 115-a may transmit a random set of bits or a pattern of bits different from ACK/NACK sequences of bits. Once received, the base station 105-a may detect discontinuous transmission (DTX) for the UE 115-a.

In some cases (e.g., when a UE 115-a wants to transmit uplink control information and data together), the UE 115-a may piggyback UCI on PUSCH. HARQ-ACK/NACK may be mapped to REs around one or more DMRS symbols. If PUSCH is punctured by HARQ-ACK/NACK, CSI part 1 (e.g., CSI part 1 information) mapping may start after some certain amount of reserved HARQ-ACK/NACK REs. In some cases, PUSCH may be mapped to reserved REs. If PUSCH is rate matched by HARQ-ACK/NACK, HARQ-ACK/NACK may be mapped first, followed by CSI part 1 mapping. In some cases, CSI part 2 may be mapped after CSI part 1 mapping, after uplink shared channel (e.g., PUSCH data) mapping, etc. depending on different system implementation.

Modulated HARQ-ACK/NACK symbols may be mapped starting on the first available non-DMRS symbol after the first DMRS symbol(s) (e.g., regardless of the number of DMRS symbols in the PUSCH transmission). Modulated CSI part 1 symbols may be mapped starting on the first available non-DMRS symbol (e.g., regardless of the number of DMRS symbols in the PUSCH transmission. In some cases, CSI part 1 may not be mapped on the reserved HARQ-ACK/NACK REs (e.g., reserved REs) in case of HARQ-ACK/NACK puncturing PUSCH (e.g., in case HARQ-ACK/NACK punctures the reserved REs, it may be desirable to avoid mapping CSI part 1 on the reserved REs such that HARQ-ACK/NACK may not puncture the CSI part 1). CSI part 1 may not be mapped on the HARQ-ACK/NACK REs in case of HARQ-ACK/NACK rate-matching PUSCH. Modulated CSI part 2 symbols may be mapped starting on the first available non-DMRS symbol (e.g., regardless of the number of DMRS symbols in the PUSCH transmission). CSI part 2 may be mapped on the reserved HARQ-ACK/NACK REs in case of HARQ-ACK/NACK puncturing PUSCH. In some cases, CSI part 2 may not be mapped on the HARQ-ACK/NACK REs in case of HARQ-ACK/NACK rate-matching PUSCH. In some cases, CSI part 2 may not be mapped on the CSI part 1 REs.

Reserved REs (e.g., HARQ-ACK/NACK REs, REs reserved for puncturing, etc.) may be included in the PUSCH. Reserved REs may be included if PUSCH may be punctured by ACK bits (e.g., no downlink assignment index (DAI) in PUSCH grant, or DAI indicates 1 or 2 bits for ACK). In some cases, two ACK bits may be reserved (e.g., the number of reserved REs may assume two ACK bits) regardless of the actual ACK payload sizes. CSI part 1 may begin after reserved REs, and may, in some cases, not be mapped to reserved REs (e.g., to avoid potential puncturing by HARQ-ACK/NACK). CSI part 2 may be mapped after CSI part 1 and may, in some cases, be mapped to reserved REs.

In some cases (e.g., when PUSCH includes CSI but not data), aperiodic CSI may be transmitted on PUSCH without data. In such cases, there may be instances where some REs may be empty. This may result in power spectral density (PSD) implications (e.g., on symbols including reserved REs) where PSD across symbols of the PUSCH may differ (e.g., which may result in base station 105-a reception issues).

In some cases, UE 115-a may determine a number of REs available for CSI part 2 mapping and calculate a coding rate for CSI part 2. In the event the calculated coding rate exceeds the maximum coding rate allowed (e.g., the calculated coding rate may be ½ and the maximum coding rate may be ⅓), UE 115-a may drop certain bits from the CSI part 2 to decrease the coding rate. UE 115-a may drop bits in accordance to some predefined rules. In some cases, the remaining information bits in CSI part 2 (e.g., the last group of bits to be dropped) may still exceed the maximum allowable coding rate. However, UE 115-a may keep the remaining information bits of CSI part 2 to prevent resources (e.g., resources allocated for CSI part 2 or reserved for feedback) from being empty.

In some other cases, aperiodic CSI may include CSI part 1 only (e.g., CSI may not include CSI part 2). When PUSCH only has CSI part 1 and possible ACK puncturing PUSCH, two ACK bits may be mapped to reserved REs before CSI part 1. If there are no ACK bits or there is only one ACK bit on reserved REs, some of the reserved REs may be empty.

In scenarios where the UE 115-a has no ACK bits, the UE 115-a may fill reserved REs with digital zeros, a pattern or sequence of bits, known bits, random bits, or CSI part 1. In other examples, the UE 115-a may fill in analog zeros (e.g., data power boosting) when the UE has no ACK bits. In scenarios where the UE has one ACK bit, the UE may repeat information bits in the remaining reserved REs (e.g., the reserved REs that do not include the ACK bit), repeat encoded bits in the remaining reserved REs, fill in the remaining reserved REs with CSI part 1, fill in digital zeros or analog zeros, etc.

In cases where digital zeros are used to fill in unused reserved REs (e.g., REs not utilized for HARQ-ACK/NACK), the base station 105-a may know or realize the used bits (e.g., the digital zeros may be known to base station 105-a). In some cases, the known bits may be a predefined pattern. The pattern may be unique so that the digital zeros used to fill in the unused reserved REs are distinct from sequences corresponding to one or two HARQ-ACK/NACK bit sequences. For example, the known bits may be an N-bit pattern, where N>2, which may allow the pattern to be unique from the HARQ-ACK/NACK bits. The UE 115-a may apply cell-specific scrambling to the pattern before transmitting to base station 105-a. In some cases, UE 115-a may not have a predefined pattern to transmit, and may instead transmit an encoded HARQ-NACK/NACK, or in other cases, random bits not known to base station 105-a.

In the case where the bits are known by the base station 105-a, the base station 105-a may use the digital zeros as DMRS REs in hypothesis testing (e.g., in cyclic prefix-OFDM (CP-OFDM) waveforms). For example, a first hypothesis (e.g., hypothesis with no ACK puncture) may indicate all reserved REs are used as DMRS REs, a second hypothesis (e.g., hypothesis with one ACK bit puncture) may indicate unused reserved REs are used as DMRS REs, and a third hypothesis (e.g., hypothesis with two ACK bit puncture) may indicate no reserved REs used as DMRS REs. In the case where the digital zero bits are not known, base station 105-*a* may use the digital zeros to detect DTX. That is, base station 105-*a* may recognize the predefined pattern and determine there has not been a HARQ-ACK/NACK transmission.

In cases where analog zeros are used to fill in unused reserved REs, UE 115-*a* may keep reserved REs empty, but may power boost data symbols (e.g., other REs in the symbol duration with the reserved REs) to maintain the same PSD (e.g., as other symbols in the transmission that do not include empty reserved REs).

In cases where CSI part 1 is used to fill in unused reserved REs (e.g., when PUSCH includes CSI part 1 but not data and/or CSI part 2), UE 115-*a* may map CSI part 1 to the reserved REs first. In some cases, CSI part 1 may be mapped to the reserved REs from the beginning. In some other cases, UE 115-*a* may map specific information in CSI part 1 to the unused REs. For example, UE may reencode only the RI and CRI information from CSI part 1 and map those bits to the reserved REs. When CSI part 1 is used to fill in the unused reserved REs, CSI part 1 may also be mapped from its beginning in the designated CSI part 1 REs. This may simplify PUSCH reception for base station 105-*a* as the starting position of CSI part 1 remains consistent across various scenarios.

In some examples, CSI part 1 mapping may begin at the reserved REs and continue to be mapped to the resources designated for CSI part 1. In such instances, the starting position for mapping CSI part 1 may be different than other scenarios, such as those where CSI part 2 or PUSCH data may be present and CSI part 1 mapping begins after the reserved REs.

In cases where there is one ACK bit, the one ACK bit may only fill up a part of reserved REs. In such cases, the UE 115-*a* may, apart from filling digital or analog zeros, use all reserved REs for the one ACK bit. For example, the UE 115-*a* may repeat information bits (e.g., to fill 2 total bits, and for encoding, such as a simplex code). In this example, base station 105-*a* may not distinguish the repeated information bits as indicating one ACK bit rather than indicating two separate ACK bits. As another example, the UE 115-*a* may repeat the encoded bits such that the one bit may be encoded (e.g., a repetition code) and rate matched to all reserved REs. In this example, base station 105-*a* may determine one ACK has been indicated rather than two separate ACKs.

In some examples, dynamic reservation may be employed. That is, reserved REs may be reserved according to the UE ACK payload size. For example, a number of REs to be reserved may depend on the UE ACK payload size.

Figure 3:
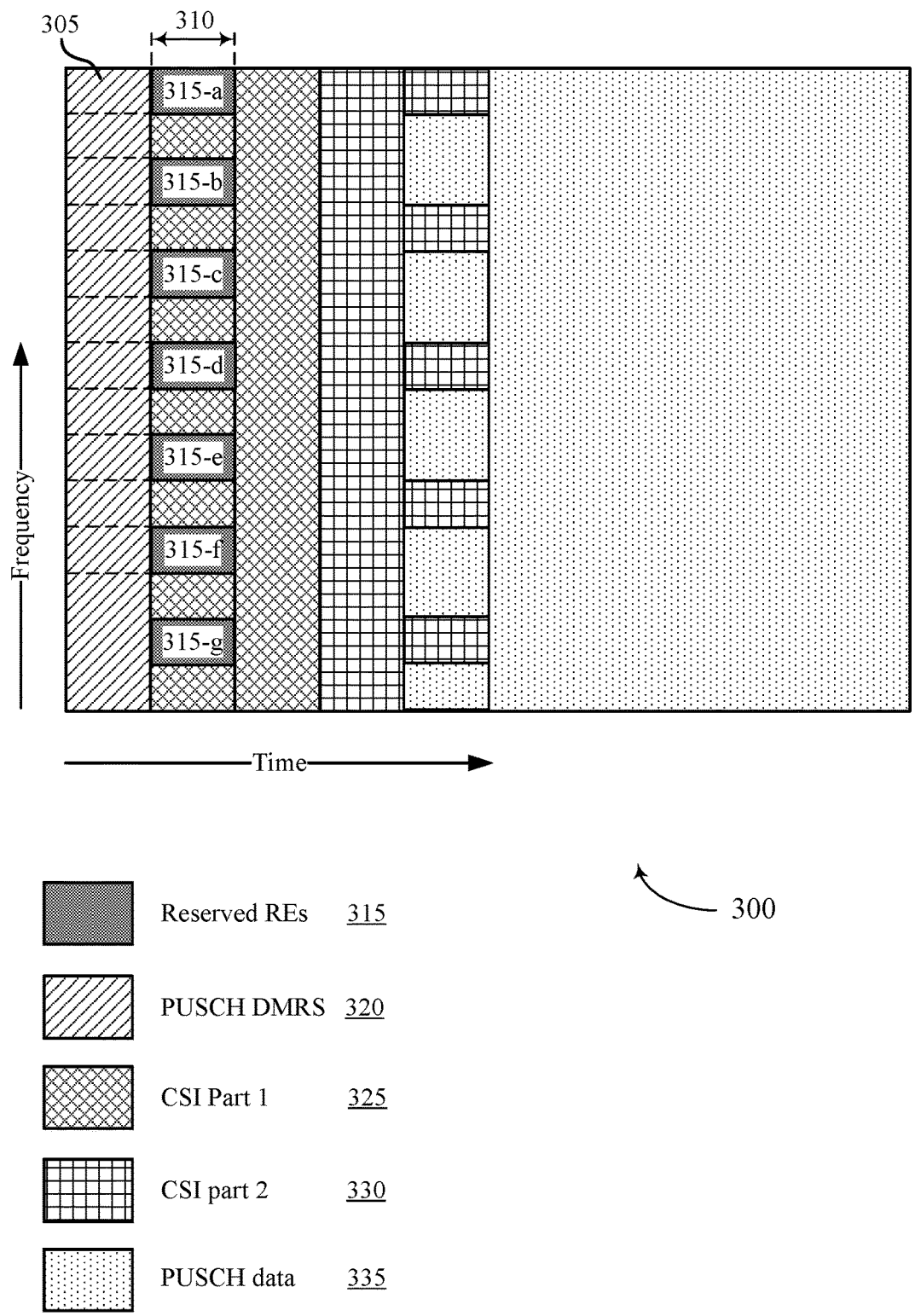
FIG. 3 illustrates an example of a transmission that supports feedback bit reservation for uplink control piggybacking in accordance with aspects of the present disclosure.

FIG. 3 illustrates an example of a transmission 300 that supports feedback bit reservation for uplink control piggybacking in accordance with various aspects of the present disclosure. In some examples, transmission 300 may implement aspects of wireless communication system 100. Transmission 300 may depict or include a PUSCH transmission over some transmission duration. Transmission 300 may include several REs 305, which may each span a symbol 310 (e.g., an OFDM symbol) in the time domain, as well as span some frequency (e.g., subcarrier). That is, transmission 300 may illustrate OFDM symbols and subcarriers that are a set of time and frequency resources that a base station 105 may allocate to a UE 115 for an uplink transmission. Frequency is shown from top to bottom, and time is shown from left to right. The bandwidth of transmission 300 may represent all or a portion of a system bandwidth that the base station 105-*a* may allocate to one or more UEs 115. In some examples, the time and frequency resources of transmission 300 may correspond to a resource block that includes 14 subcarriers and 10 symbol periods. The techniques described herein may be applied to other transmissions with different time and frequency resources including other numbers of subcarriers and/or symbol periods by analogy, without departing from the scope of the present disclosure.

In the present example, a first symbol period (e.g., a first symbol 310 of transmission 300, the leftmost column) may be a PUSCH DMRS 320. A second symbol period may include both CSI Part 1 REs 325 as well as reserved REs 315. For example, CSI Part 1 REs 320 and reserved REs 315 may alternate in the frequency domain within the second symbol period (e.g., every other carrier in the second symbol period may include a reserved RE 315). In some cases, PUSCH may include one symbol duration for reserved REs (e.g., in the example of FIG. 3, the second symbol duration may include reserved REs, other symbol durations may not include reserved REs). The third symbol period may include CSI Part 1 REs 320. The fourth symbol period may include CSI part 2 REs 330. The fifth symbol period may include both CSI part 2 REs 330 and PUSCH data REs 335. The remaining REs of transmission 300 may include PUSCH data REs 335 (e.g., the remaining 5 symbol periods in the example of FIG. 3).

As discussed above, reserved REs 315 (e.g., HARQ-ACK/NACK REs, REs reserved for puncturing, etc.) may be included in the transmission 300 (e.g., in a PUSCH). In some case, reserved REs 315 may be included if PUSCH may be punctured by ACK bits. In some cases, a number of reserved REs 315 included in transmission 300 may assume two ACK bits (e.g., regardless of the actual ACK payload sizes). Reserved REs 315 may be mapped following mapping of PUSCH DMRS REs 320. That is, reserved REs 315-*a* through 315-*g* may be mapped after PUSCH DMRS is mapped to PUSCH DMRS REs 320. CSI part 1 may then be mapped to CSI part 1 REs 325 following mapping of reserved REs 315-*a* through 315-*g*. CSI part 2 may be mapped to CSI part 2 REs and PUSCH data may be mapped to PUSCH data REs 335. Accordingly, CSI part 1 may be prioritized over CSI part 2. That is, mapping CSI part 1 to CSI part 1 REs 320 after mapping reserved REs 315 may reduce the likelihood of CSI part 1 puncturing by HARQ-ACK/NACK, as CSI part 1 may not be mapped to reserved REs 315 (e.g., as they are mapped immediately after reserved RE mapping, whereas CSI part 2 may, in some cases, be mapped to reserved REs, which may be punctured by ACK bits). This may prioritize CSI part 1 by avoiding puncturing of CSI part 1.

In one ACK bit scenarios, only a portion of reserved REs 315 may be used. For example, reserved RE 315-*a*, reserved RE 315-*b*, and reserved RE 315-*c* may be used for the ACK bit, the encoded ACK bit, etc. In such cases, the remaining reserved REs (e.g., reserved RE 315-*d*, reserved RE 315-*e*, reserved RE 315-*f*, and reserved RE 315-*g*) may be handled using the techniques described above. For example, reserved RE 315-*d*, reserved RE 315-*e*, reserved RE 315-*f*, and reserved RE 315-*g* may be filled with digital zeros, known bits, random bits, etc. Alternatively, the symbol duration including the reserved REs 315 (e.g., and thus remaining unused reserved REs 315) may be filled with analog zeros. In such cases, the used REs (e.g., all REs but the empty remaining reserved REs 315) in the symbol duration with the reserved REs 315 may be power boosted. This may result in the PSD of the symbol duration that included empty reserved REs more closely resembling the PSD of the other symbol durations of the transmission 300. In some other examples, reserved RE 315-*d*, reserved RE 315-*e*, reserved RE 315-*f*, and reserved RE 315-*g* may be filled with CSI part 1 bits, one or more portions of CSI part 2 bits (e.g., the remaining portions of CSI part 2 after dropping other portions due to maximum allowable code rate), a pattern or sequence of bits.

Example transmission 300 is shown for exemplary purposes only. Techniques described herein may be applied to a different number of reserved REs (e.g., assuming some other number of ACK bits), different mapping of PUSCH DMRS, CSI part 1, CSI part 2, and PUSCH data (e.g., different numbers of REs or different arrangements of REs for such mapping), etc. by analogy, without departing from the scope of the present disclosure.

Figure 4:
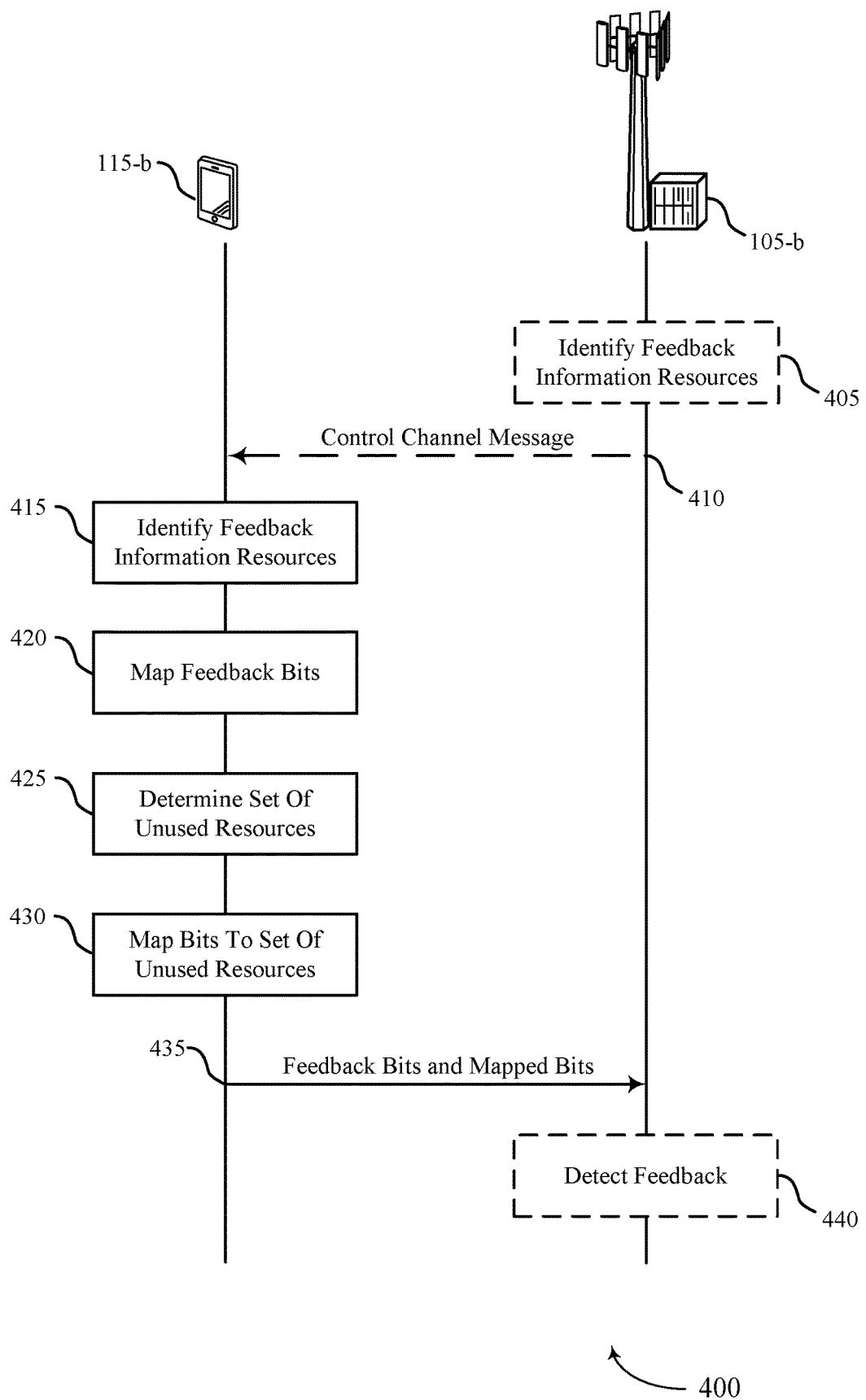
FIG. 4 illustrates an example of a process flow that supports feedback bit reservation for uplink control piggybacking in accordance with aspects of the present disclosure.

FIG. 4 illustrates an example of a process flow 400 that supports feedback bit reservation for uplink control piggybacking in accordance with various aspects of the present disclosure. In some examples, process flow 400 may implement aspects of wireless communications system 100 or 200. As shown, process flow 400 may be implemented by a UE 115-*b* and base station 105-*b*, each of which may be examples of the corresponding devices described herein.

At 405, base station 105-*b* may optionally identify a set of resources reserved for feedback information within a TTI. In some cases, the feedback information resources may be for a PUSCH. At 410, base station 105-*b* may transmit a control channel message to UE 115-*b*. The control channel message may include a DAI.

At 415, UE 115-*b* may identify a set of resources reserved for feedback information within a TTI. In some examples, UE 115-*b* may identify the set of resources reserved for feedback information based on the DAI transmitted by base station 105-*b* at 410.

At 420, UE 115-*b* may map a number of feedback bits to the set of resources reserved for feedback information. In some cases, the number of feedback bits may be zero. In some other cases, the number of feedback bits may be one.

At 425, UE 115-*b* may determine that there is a set of unused resources within the set of resources reserved for feedback information. In some examples, UE 115-*b* may determine this based on the number of feedback bits mapped to the feedback information resources at 410.

At 430, UE 115-*b* may map a number of bits to the set of unused resources determined at 415. In some examples, UE 115-*b* may fill the set of unused resources with a predetermined pattern of bits, where the pattern of bits is different from an ACK sequence and a NACK sequence. In some other examples, UE 115-*b* may fill the set of unused resources with random bits. In some aspects, UE 115-*b* may fill the set of unused resources with a first part of CSI bits. In some cases, when the number of feedback bits may be one, UE 115-*b* may fill the set of unused resources by repeating the feedback bits.

At 435, UE 115-*b* may transmit to base station 105-*b* the mapped number of feedback bits and the mapped number of bits via the set of resources reserved for feedback information. In some cases, base station 105-*b* may receive a pattern of bits via the set of resources reserved for feedback information, where the pattern of bits may be different from an ACK sequence and a NACK sequence.

At 440, base station 105-*b* may optionally detect feedback from UE 115-*b*. In some examples, base station 105-*b* may detect DTX for UE 115-*b* based on receiving a pattern of bits at 435.

Figure 5:
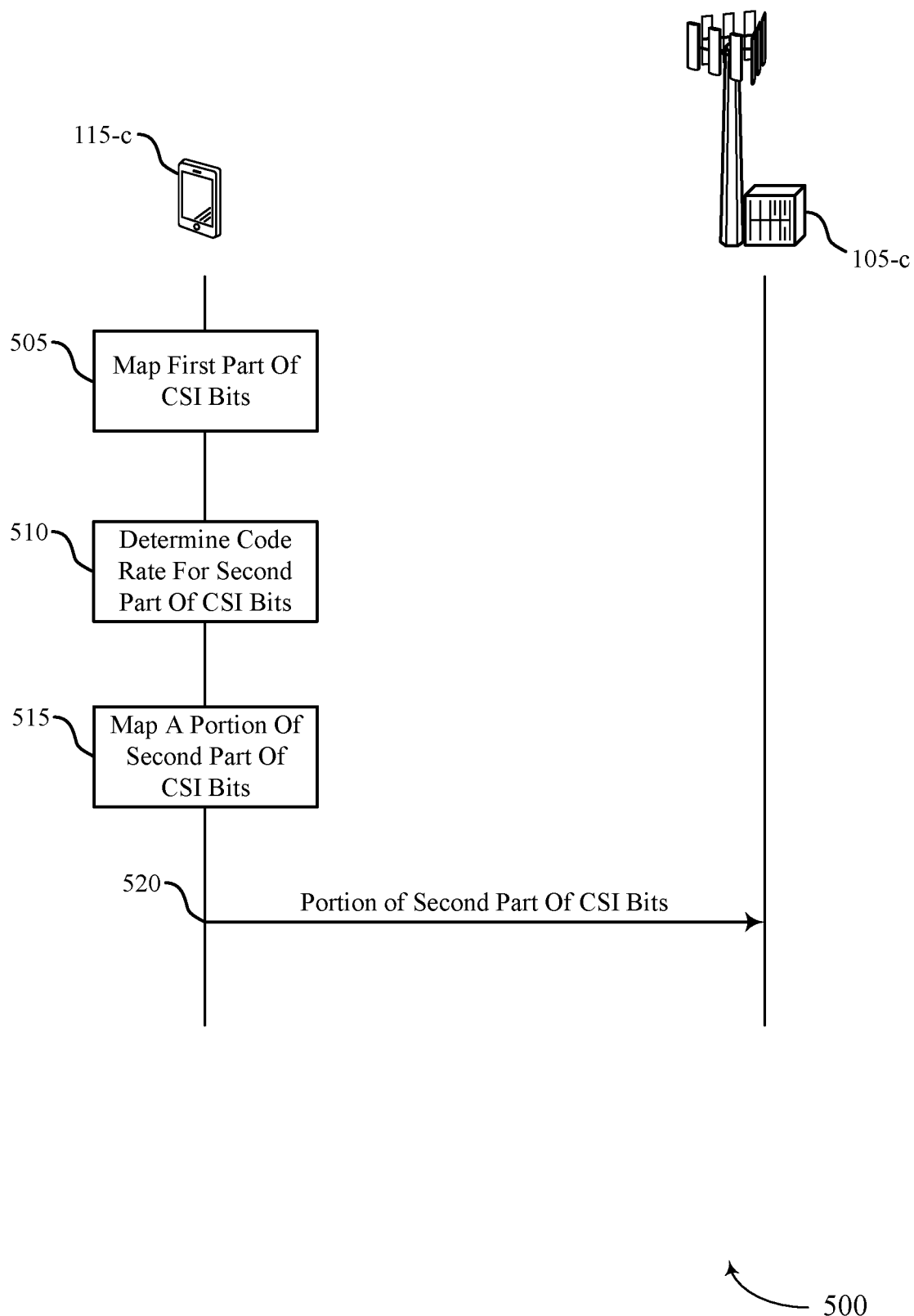
FIG. 5 illustrates an example of a process flow that supports feedback bit reservation for uplink control piggybacking in accordance with aspects of the present disclosure.

FIG. 5 illustrates an example of a process flow 500 that supports feedback bit reservation for uplink control piggybacking in accordance with various aspects of the present disclosure. In some examples, process flow 500 may implement aspects of wireless communications systems 100 or 200. As shown, process flow 500 may be implemented by a UE 115-*c* and base station 105-*c*, each of which may be examples of the corresponding devices described herein.

At 505, UE 115-*c* may map a first part of CSI bits to a first set of resources within a TTI. At 510, UE 115-*c* may determine a code rate for a second part of CSI bits.

At 515, UE 115-*c* may map at least a portion of the second part of CSI bits to a second set of resources within the TTI. In some cases, UE 115-*c* may map the portion of the second part of CSI bits to the second set of resources based on a comparison of the code rate determined at 510 and a maximum code rate for the second part of CSI bits. In some examples, UE 115-*c* may drop a first portion of the second part of CSI bits based on the comparison of code rates. In this example, the portion of the second part of CSI bits being mapped to the second set of resources may be the remaining second portion of the second part of CSI bits. UE 115-*c* may determine an effective coding rate of the second portion of the second part of CSI bits. In some cases, the effective coding rate may exceed the maximum coding rate.

At 520, UE 115-*c* may transmit to base station 105-*c* the portion of the second part of CSI bits to the base station based at least in part on the mapping at 515. In some cases, the portion of the second part of CSI bits transmitted to base station 105-*c* may be the second portion with an effective coding rate that may exceed the maximum coding rate. In some examples, UE 115-*c* may transmit the second portion of the second part of CSI bits to base station 105-*c* with the effective coding rate that may exceed the maximum coding rate.

Figure 6:
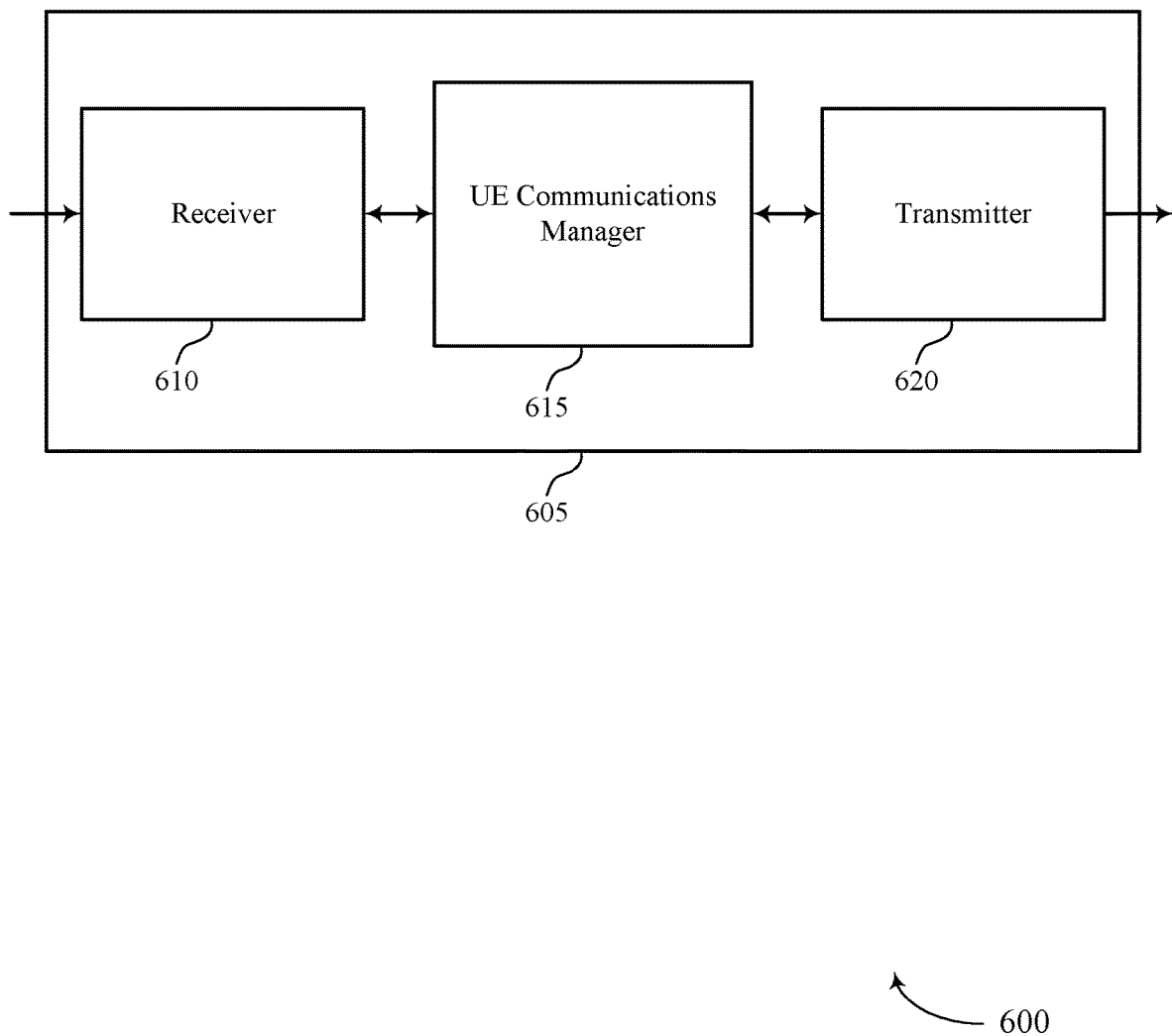
FIGS. 6 through 8 show block diagrams of a device that supports feedback bit reservation for uplink control piggybacking in accordance with aspects of the present disclosure.

FIG. 6 shows a block diagram 600 of a wireless device 605 that supports feedback bit reservation for uplink control piggybacking in accordance with aspects of the present disclosure. Wireless device 605 may be an example of aspects of a UE 115 as described herein. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to feedback bit reservation for uplink control piggybacking, etc.). Information may be passed on to other components of the device. The receiver 610 may be an example of aspects of the transceiver 935 described with reference to FIG. 9. The receiver 610 may utilize a single antenna or a set of antennas.

UE communications manager 615 may be an example of aspects of the UE communications manager 915 described with reference to FIG. 9. UE communications manager 615 and/or at least some of its various sub-components may be implemented in hardware, software executed by a processor, firmware, or any combination thereof. If implemented in software executed by a processor, the functions of the UE communications manager 615 and/or at least some of its various sub-components may be executed by a general-purpose processor, a digital signal processor (DSP), an application-specific integrated circuit (ASIC), an field-programmable gate array (FPGA) or other programmable logic device (PLD), discrete gate or transistor logic, discrete hardware components, or any combination thereof designed to perform the functions described in the present disclosure.

The UE communications manager 615 and/or at least some of its various sub-components may be physically located at various positions, including being distributed such that portions of functions are implemented at different physical locations by one or more physical devices. In some examples, UE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 615 may identify a set of resources reserved for feedback information within a TTI, map a number of feedback bits for transmission to a base station to the set of resources reserved for feedback information, determine a set of unused resources of the set of resources reserved for feedback information based on the number of feedback bits, map a number of bits to the set of unused resources, and transmit, to the base station, the mapped number of feedback bits and the mapped number of bits via the set of resources reserved for feedback information.

The UE communications manager 615 may also map a first part of CSI bits to a first set of resources within a TTI, determine a code rate for a second part of CSI bits, map at least a portion of the second part of CSI bits to a second set of resources within the TTI based on a comparison of the code rate and a maximum code rate for the second part of CSI bits, and transmit at least the portion of the second part of CSI bits to the base station based on the mapping.

The UE communications manager 615 may also identify a number of feedback bits for transmission within a TTI to a base station, reserve a set of resources for the number of feedback bits based on a size of the number of feedback bits, map the number of feedback bits to the reserved set of resources, and transmit the mapped number of feedback bits to the base station.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
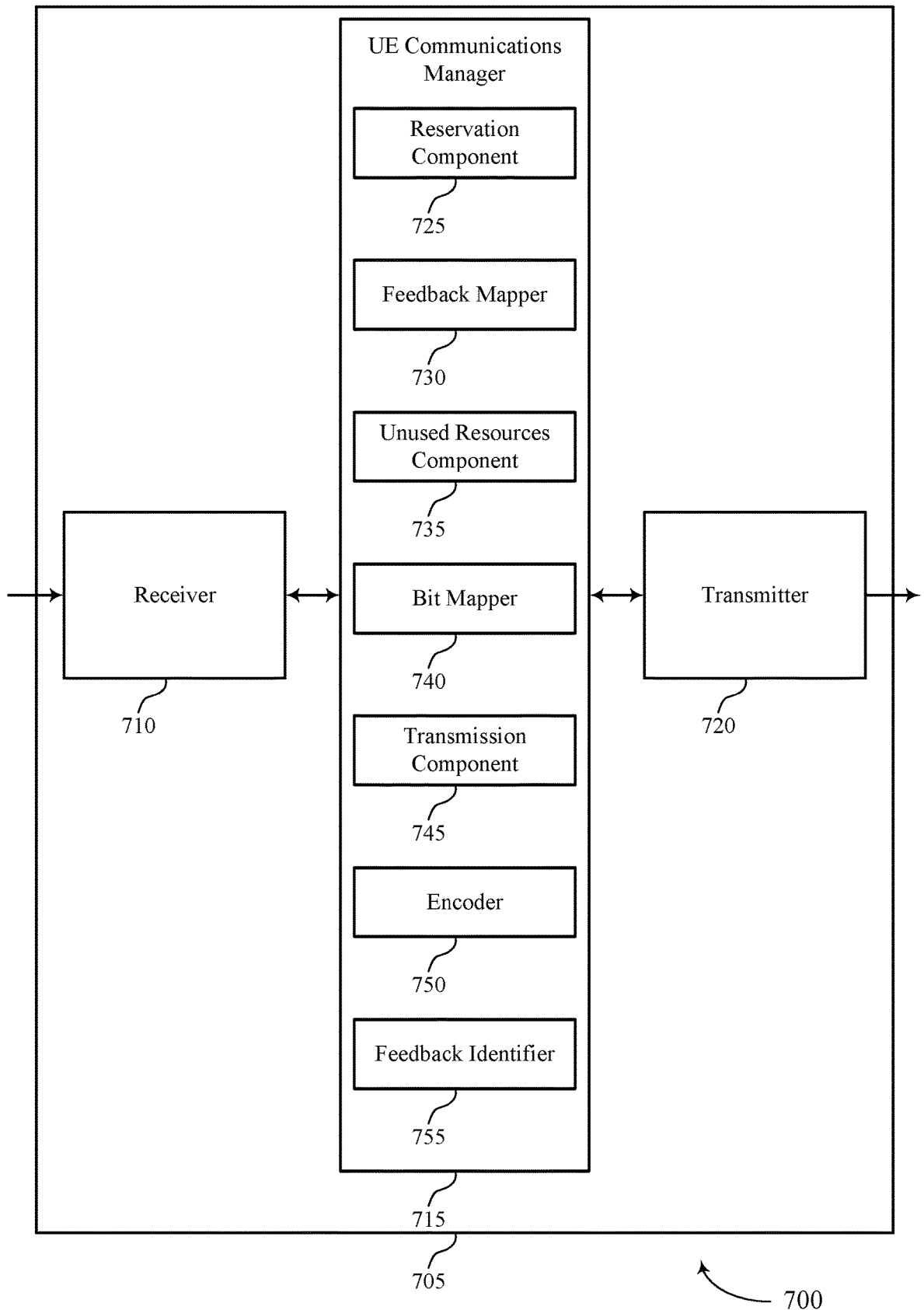

FIG. 7 shows a block diagram 700 of a wireless device 705 that supports feedback bit reservation for uplink control piggybacking in accordance with aspects of the present disclosure. Wireless device 705 may be an example of aspects of a wireless device 605 or a UE 115 as described with reference to FIG. 6. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to feedback bit reservation for uplink control piggybacking, etc.). Information may be passed on to other components of the device. The receiver 710 may be an example of aspects of the transceiver 935 described with reference to FIG. 9. The receiver 710 may utilize a single antenna or a set of antennas.

UE communications manager 715 may be an example of aspects of the UE communications manager 915 described with reference to FIG. 9. UE communications manager 715 may also include reservation component 725, feedback mapper 730, unused resources component 735, bit mapper 740, transmission component 745, encoder 750, and feedback identifier 755.

Reservation component 725 may identify a set of resources reserved for feedback information within a TTI and reserve a set of resources for the number of feedback bits based on a size of the number of feedback bits. In some cases, the set of resources reserved for feedback information includes a set of REs within a symbol of the TTI.

Feedback mapper 730 may map a number of feedback bits for transmission to a base station to the set of resources reserved for feedback information and map the number of feedback bits to the reserved set of resources.

Unused resources component 735 may determine a set of unused resources of the set of resources reserved for feedback information based on the number of feedback bits. In some cases, the number of feedback bits for transmission to the base station is zero. In some cases, the number of feedback bits for transmission to the base station is one.

Bit mapper 740 may map a number of bits to the set of unused resources, map CSI bits around the set of resources reserved for the number of feedback bits, repeat the mapping of the first part of CSI bits to resources around the set of unused resources, repeat a set of information feedback bits prior to mapping, where the repeated set of information feedback bits are mapped to an entirety of the set of resources reserved for feedback information, repeat a set of encoded feedback bits prior to mapping, where the repeated set of encoded feedback bits are mapped to an entirety of the set of resources reserved for feedback information, map a first part of CSI bits to a first set of resources within a TTI, map at least a portion of the second part of CSI bits to a second set of resources within the TTI based on a comparison of the code rate and a maximum code rate for the second part of CSI bits, and map the second portion of the second part of CSI bits to the second set of resources allocated for the second part of CSI bits. In some cases, the predetermined pattern of bits includes a sequence of bits that is different from an ACK sequence, a NACK sequence, or any combination thereof. In some cases, the sequence is different from each of a one bit ACK sequence, a one bit NACK sequence, a permutation of the one bit ACK sequence and the one bit NACK sequence, a two bit ACK sequence, and a two bit NACK sequence. In some cases, the predetermined pattern of bits is used for DTX detection. In some cases, mapping the number of bits to the set of unused resources includes filling the set of unused resources with a random pattern of bits. In some cases, the random pattern of bits is used for DTX detection. In some cases, mapping the number of bits to the set of unused resources includes mapping a first part of CSI bits to the set of unused resources. In some cases, the first part of CSI bits mapped to the set of unused resources includes a reduced payload of CSI bits. In some cases, the reduced payload of CSI bits corresponds to a RI and a CRI. In some cases, mapping the number of bits to the set of unused resources includes filling the set of unused resources with a set of predetermined digital bits. In some cases, the set of predetermined digital bits includes a set of zeros, a set of pseudo random bits, or a set of known bits. In some cases, mapping the number of bits to the set of unused resources includes filling the set of unused resources with a set of CSI bits. In some cases, mapping the number of bits to the set of unused resources includes filling the set of unused resources with a predetermined pattern of bits. In some cases, the repeated set of information feedback bits are encoded based on a simplex code. In some cases, mapping the number of bits to the set of unused resources includes filling the set of unused resources with a set of predetermined digital bits. In some cases, the set of predetermined digital bits includes a set of zeros, a set of random bits, or a set of known bits. In some cases, mapping the number of bits to the set of unused resources includes filling the set of unused resources with a set of CSI bits. In some cases, the set of CSI bits includes a first part of CSI bits. In some cases, the second portion of the second part of CSI bits excludes the first portion of the second part of CSI bits. In some cases, at least the portion of the second part of CSI bits is mapped to a set of resources reserved for feedback information. In some cases, the set of CSI bits includes a first part of CSI bits.

Transmission component 745 may transmit, to the base station, the mapped number of feedback bits and the mapped number of bits via the set of resources reserved for feedback information, transmit the mapped second portion of the second part of CSI bits to the base station, transmit at least the portion of the second part of CSI bits to the base station based on the mapping, transmit the mapped number of feedback bits to the base station, transmit, to the base station, the mapped CSI bits, multiplex a set of shared data bits with the mapped number of feedback bits, and transmit the multiplexed set of shared data bits and the mapped number of feedback bits via a PUSCH.

Encoder 750 may encode the repeated set of information feedback bits prior to mapping, encode the number of feedback bits based on a repetition code, rate-match the encoded number of feedback bits to the set of resources reserved for feedback information, determine a code rate for a second part of CSI bits, drop a first portion of the second part of CSI bits based on the comparison of the code rate and the maximum code rate, and determine that an effective code rate for a second portion of the second part of CSI bits exceeds the maximum code rate.

Feedback identifier 755 may identify a number of feedback bits for transmission within a TTI to a base station. In some cases, the size of the number of feedback bits is based on a payload size for a set of HARQ bits. In some cases, the TTI includes resources of a PUSCH.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
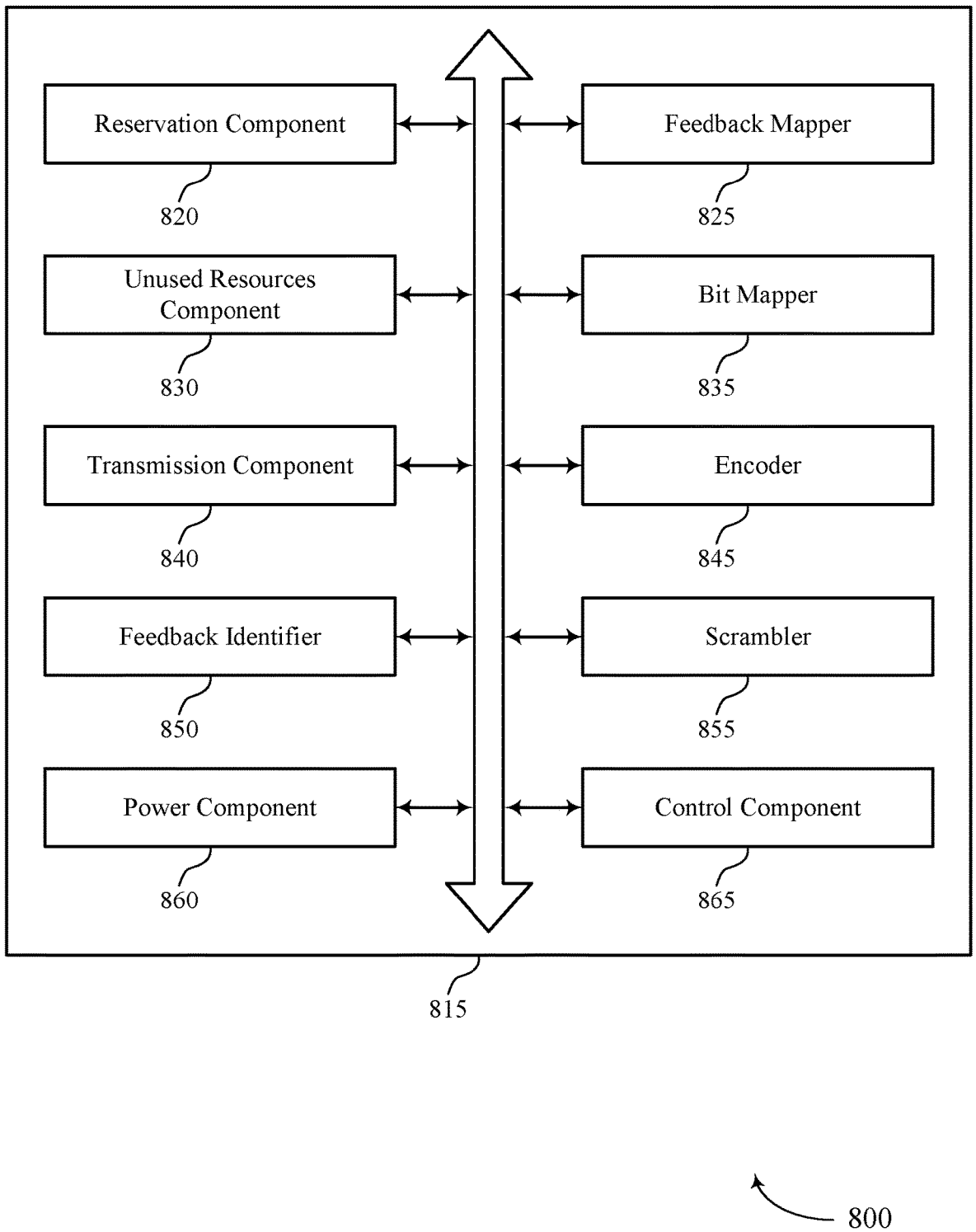

FIG. 8 shows a block diagram 800 of a UE communications manager 815 that supports feedback bit reservation for uplink control piggybacking in accordance with aspects of the present disclosure. The UE communications manager 815 may be an example of aspects of a UE communications manager 615, a UE communications manager 715, or a UE communications manager 915 described with reference to FIGS. 6, 7, and 9. The UE communications manager 815 may include reservation component 820, feedback mapper 825, unused resources component 830, bit mapper 835, transmission component 840, encoder 845, feedback identifier 850, scrambler 855, power component 860, and control component 865. Each of these modules may communicate, directly or indirectly, with one another (e.g., via one or more buses).

Reservation component 820 may identify a set of resources reserved for feedback information within a TTI and reserve a set of resources for the number of feedback bits based on a size of the number of feedback bits. In some cases, the set of resources reserved for feedback information includes a set of REs within a symbol of the TTI.

Feedback mapper 825 may map a number of feedback bits for transmission to a base station to the set of resources reserved for feedback information and map the number of feedback bits to the reserved set of resources.

Unused resources component 830 may determine a set of unused resources of the set of resources reserved for feedback information based on the number of feedback bits. In some cases, the number of feedback bits for transmission to the base station is zero. In some cases, the number of feedback bits for transmission to the base station is one.

Bit mapper 835 may map a number of bits to the set of unused resources, map CSI bits around the set of resources reserved for the number of feedback bits, repeat the mapping of the first part of CSI bits to resources around the set of unused resources, repeat a set of information feedback bits prior to mapping, where the repeated set of information feedback bits are mapped to an entirety of the set of resources reserved for feedback information, repeat a set of encoded feedback bits prior to mapping, where the repeated set of encoded feedback bits are mapped to an entirety of the set of resources reserved for feedback information, map a first part of CSI bits to a first set of resources within a TTI, map at least a portion of the second part of CSI bits to a second set of resources within the TTI based on a comparison of the code rate and a maximum code rate for the second part of CSI bits, and map the second portion of the second part of CSI bits to the second set of resources allocated for the second part of CSI bits. In some cases, the predetermined pattern of bits includes a sequence of bits that is different from an ACK sequence, a NACK sequence, or any combination thereof. In some cases, the sequence is different from each of a one bit ACK sequence, a one bit NACK sequence, a permutation of the one bit ACK sequence and the one bit NACK sequence, a two bit ACK sequence, and a two bit NACK sequence. In some cases, the predetermined pattern of bits is used for DTX detection. In some cases, mapping the number of bits to the set of unused resources includes filling the set of unused resources with a random pattern of bits. In some cases, the random pattern of bits is used for DTX detection. In some cases, mapping the number of bits to the set of unused resources includes mapping a first part of CSI bits to the set of unused resources. In some cases, the first part of CSI bits mapped to the set of unused resources includes a reduced payload of CSI bits. In some cases, the reduced payload of CSI bits corresponds to a RI and a CRI. In some cases, mapping the number of bits to the set of unused resources includes filling the set of unused resources with a set of predetermined digital bits. In some cases, the set of predetermined digital bits includes a set of zeros, a set of pseudo random bits, or a set of known bits. In some cases, mapping the number of bits to the set of unused resources includes filling the set of unused resources with a set of CSI bits. In some cases, mapping the number of bits to the set of unused resources includes filling the set of unused resources with a predetermined pattern of bits. In some cases, the repeated set of information feedback bits are encoded based on a simplex code. In some cases, mapping the number of bits to the set of unused resources includes filling the set of unused resources with a set of predetermined digital bits. In some cases, the set of predetermined digital bits includes a set of zeros, a set of random bits, or a set of known bits. In some cases, mapping the number of bits to the set of unused resources includes filling the set of unused resources with a set of CSI bits. In some cases, the set of CSI bits includes a first part of CSI bits. In some cases, the second portion of the second part of CSI bits excludes the first portion of the second part of CSI bits. In some cases, at least the portion of the second part of CSI bits is mapped to a set of resources reserved for feedback information. In some cases, the set of CSI bits includes a first part of CSI bits.

Transmission component 840 may transmit, to the base station, the mapped number of feedback bits and the mapped number of bits via the set of resources reserved for feedback information, transmit the mapped second portion of the second part of CSI bits to the base station, transmit at least the portion of the second part of CSI bits to the base station based on the mapping, transmit the mapped number of feedback bits to the base station, transmit, to the base station, the mapped CSI bits, multiplex a set of shared data bits with the mapped number of feedback bits, and transmit the multiplexed set of shared data bits and the mapped number of feedback bits via a PUSCH.

Encoder 845 may encode the repeated set of information feedback bits prior to mapping, encode the number of feedback bits based on a repetition code, rate-match the encoded number of feedback bits to the set of resources reserved for feedback information, determine a code rate for a second part of CSI bits, drop a first portion of the second part of CSI bits based on the comparison of the code rate and the maximum code rate, and determine that an effective code rate for a second portion of the second part of CSI bits exceeds the maximum code rate.

Feedback identifier 850 may identify a number of feedback bits for transmission within a TTI to a base station. In some cases, the size of the number of feedback bits is based on a payload size for a set of HARQ bits. In some cases, the TTI includes resources of a PUSCH.

Scrambler 855 may scramble the predetermined pattern of bits using a cell-specific identifier, fill the set of unused resources with the scrambled predetermined pattern of bits, scramble the random pattern of bits using a cell-specific identifier, and fill the set of unused resources with the scrambled random pattern of bits.

Power component 860 may boost a transmission power of bits mapped around the set of resources reserved for feedback information. In some cases, the transmission power is boosted based on the set of unused resources. In some cases, the transmission power is boosted based on the set of unused resources.

Control component 865 may receive, from the base station, a control channel message that includes a DAI, where the set of resources reserved for feedback information is identified based on the DAI.

Figure 9:
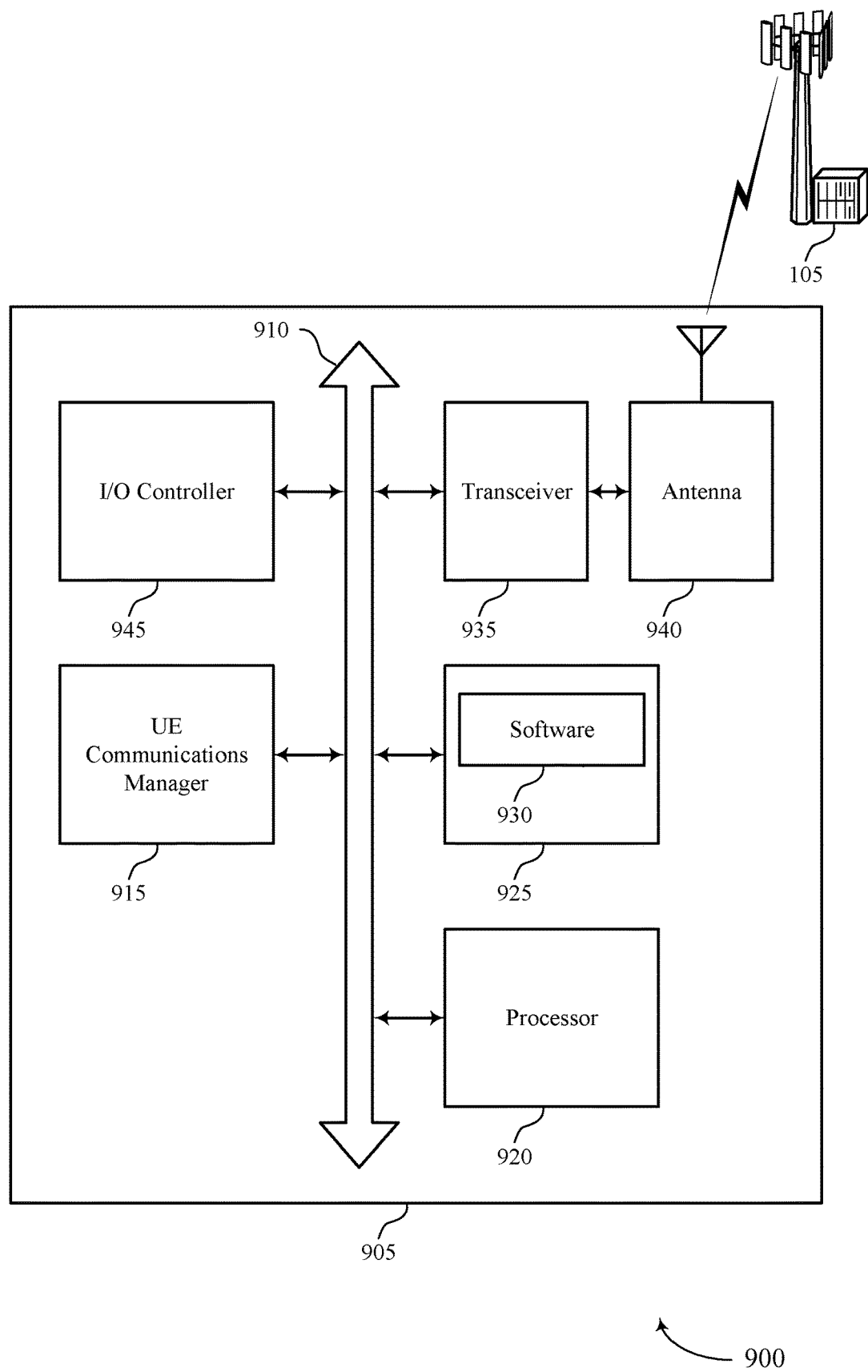
FIG. 9 illustrates a block diagram of a system including a user equipment (UE) that supports feedback bit reservation for uplink control piggybacking in accordance with aspects of the present disclosure.

FIG. 9 shows a diagram of a system 900 including a device 905 that supports feedback bit reservation for uplink control piggybacking in accordance with aspects of the present disclosure. Device 905 may be an example of or include the components of wireless device 605, wireless device 705, or a UE 115 as described above, e.g., with reference to FIGS. 6 and 7. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a PLD, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting feedback bit reservation for uplink control piggybacking).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support feedback bit reservation for uplink control piggybacking. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
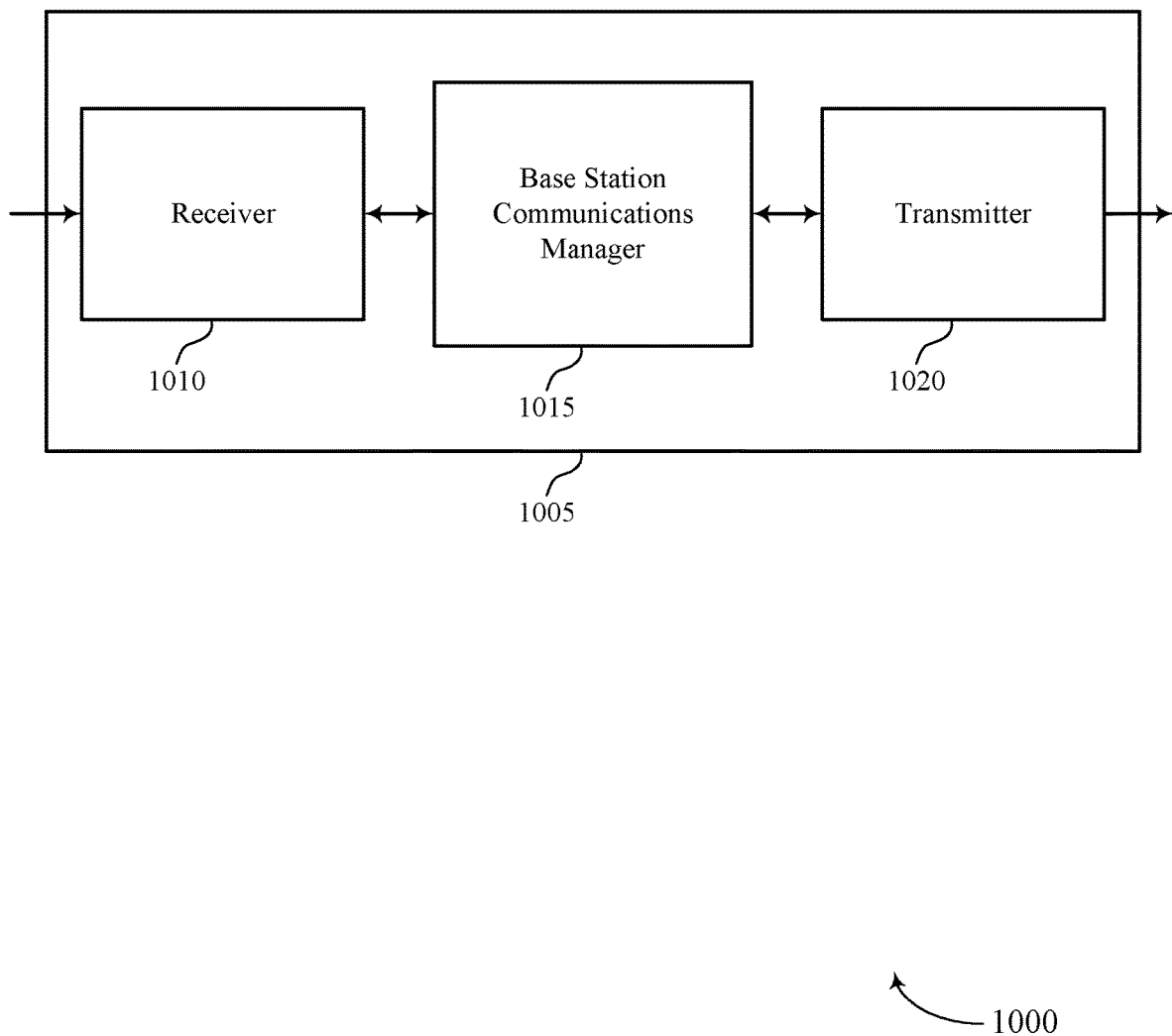
FIGS. 10 through 12 show block diagrams of a device that supports feedback bit reservation for uplink control piggybacking in accordance with aspects of the present disclosure.

FIG. 10 shows a block diagram 1000 of a wireless device 1005 that supports feedback bit reservation for uplink control piggybacking in accordance with aspects of the present disclosure. Wireless device 1005 may be an example of aspects of a base station 105 as described herein. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to feedback bit reservation for uplink control piggybacking, etc.). Information may be passed on to other components of the device. The receiver 1010 may be an example of aspects of the transceiver 1335 described with reference to FIG. 13. The receiver 1010 may utilize a single antenna or a set of antennas.

Base station communications manager 1015 may be an example of aspects of the base station communications manager 1315 described with reference to FIG. 13. Base station communications manager 1015 and/or at least some of its various sub-components may be implemented in hardware, software executed by a processor, firmware, or any combination thereof. If implemented in software executed by a processor, the functions of the base station communications manager 1015 and/or at least some of its various sub-components may be executed by a general-purpose processor, a DSP, an ASIC, an FPGA or other PLD, discrete gate or transistor logic, discrete hardware components, or any combination thereof designed to perform the functions described in the present disclosure.

The base station communications manager 1015 and/or at least some of its various sub-components may be physically located at various positions, including being distributed such that portions of functions are implemented at different physical locations by one or more physical devices. In some examples, base station communications manager 1015 and/or at least some of its various sub-components may be a separate and distinct component in accordance with various aspects of the present disclosure. In other examples, base station communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1015 may identify a set of resources reserved for feedback information within a TTI, receive, from a UE, a pattern of bits via the set of resources reserved for feedback information, where the pattern of bits includes a sequence of bits that is different from an ACK sequence, a NACK sequence, or a combination thereof, and detect DTX for the UE based on the pattern of bits.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
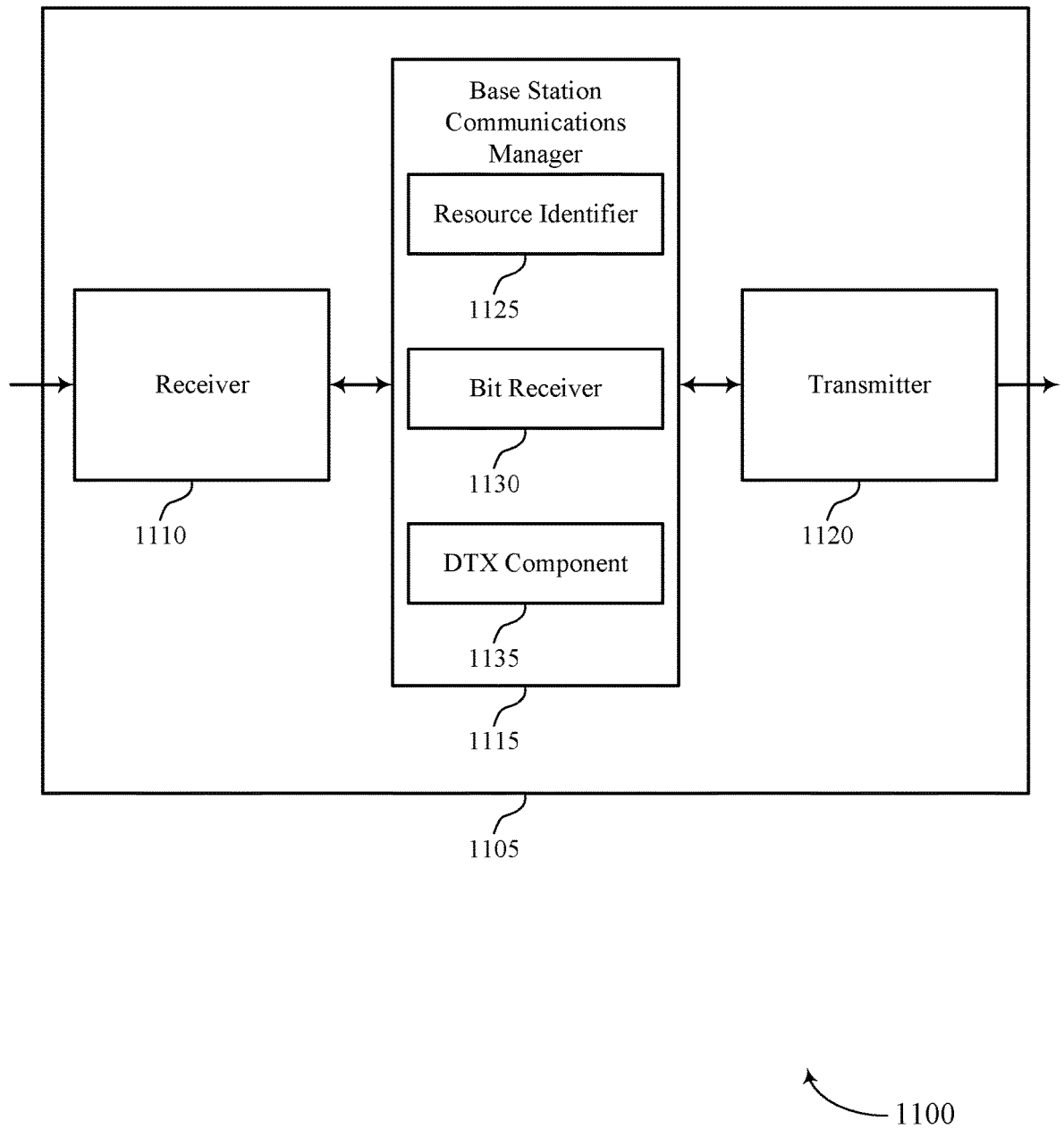

FIG. 11 shows a block diagram 1100 of a wireless device 1105 that supports feedback bit reservation for uplink control piggybacking in accordance with aspects of the present disclosure. Wireless device 1105 may be an example of aspects of a wireless device 1005 or a base station 105 as described with reference to FIG. 10. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to feedback bit reservation for uplink control piggybacking, etc.). Information may be passed on to other components of the device. The receiver 1110 may be an example of aspects of the transceiver 1335 described with reference to FIG. 13. The receiver 1110 may utilize a single antenna or a set of antennas.

Base station communications manager 1115 may be an example of aspects of the base station communications manager 1315 described with reference to FIG. 13. Base station communications manager 1115 may also include resource identifier 1125, bit receiver 1130, and DTX component 1135.

Resource identifier 1125 may identify a set of resources reserved for feedback information within a TTI.

Bit receiver 1130 may receive, from a UE, a pattern of bits via the set of resources reserved for feedback information, where the pattern of bits includes a sequence of bits that is different from an ACK sequence, a NACK sequence, or a combination thereof. In some cases, the pattern of bits includes a predetermined pattern of bits or a random pattern of bits. In some cases, the sequence is different from each of a one bit ACK sequence, a one bit NACK sequence, a permutation of the one bit ACK sequence and the one bit NACK sequence, a two bit ACK sequence, and a two bit NACK sequence.

DTX component 1135 may detect DTX for the UE based on the pattern of bits and determine a NACK response to the downlink message based on the detection of DTX.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
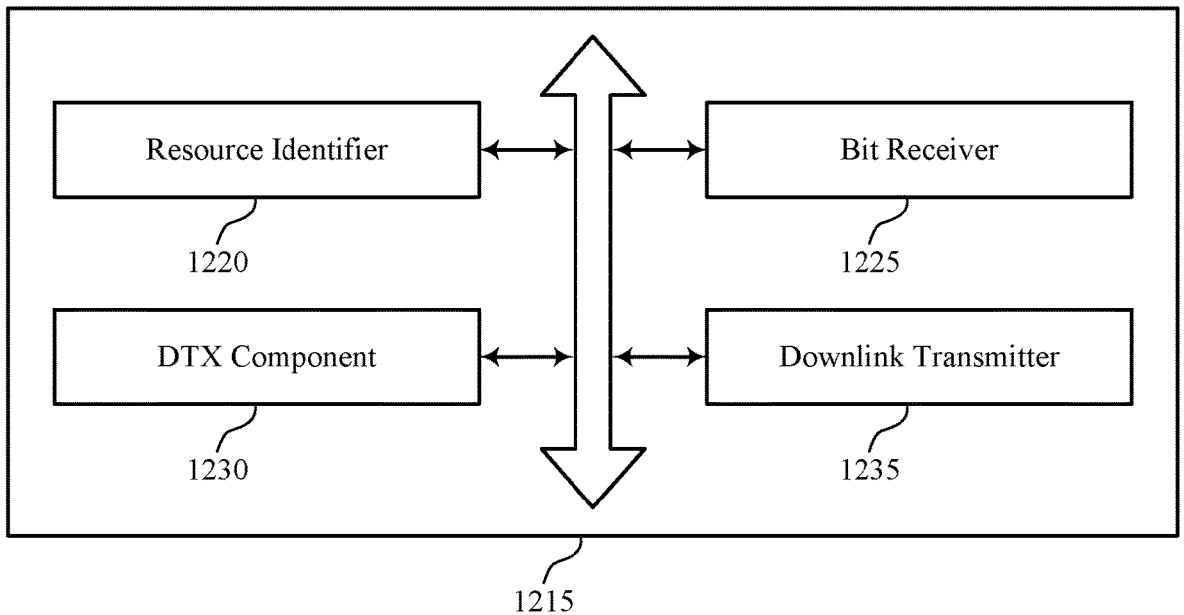

FIG. 12 shows a block diagram 1200 of a base station communications manager 1215 that supports feedback bit reservation for uplink control piggybacking in accordance with aspects of the present disclosure. The base station communications manager 1215 may be an example of aspects of a base station communications manager 1315 described with reference to FIGS. 10, 11, and 13. The base station communications manager 1215 may include resource identifier 1220, bit receiver 1225, DTX component 1230, and downlink transmitter 1235. Each of these modules may communicate, directly or indirectly, with one another (e.g., via one or more buses).

Resource identifier 1220 may identify a set of resources reserved for feedback information within a TTI.

Bit receiver 1225 may receive, from a UE, a pattern of bits via the set of resources reserved for feedback information, where the pattern of bits includes a sequence of bits that is different from an ACK sequence, a NACK sequence, or a combination thereof. In some cases, the pattern of bits includes a predetermined pattern of bits or a random pattern of bits. In some cases, the sequence is different from each of a one bit ACK sequence, a one bit NACK sequence, a permutation of the one bit ACK sequence and the one bit NACK sequence, a two bit ACK sequence, and a two bit NACK sequence.

DTX component 1230 may detect DTX for the UE based on the pattern of bits and determine a NACK response to the downlink message based on the detection of DTX.

Downlink transmitter 1235 may transmit a downlink message to the UE, where the pattern of bits is received in response to the downlink message.

Figure 13:
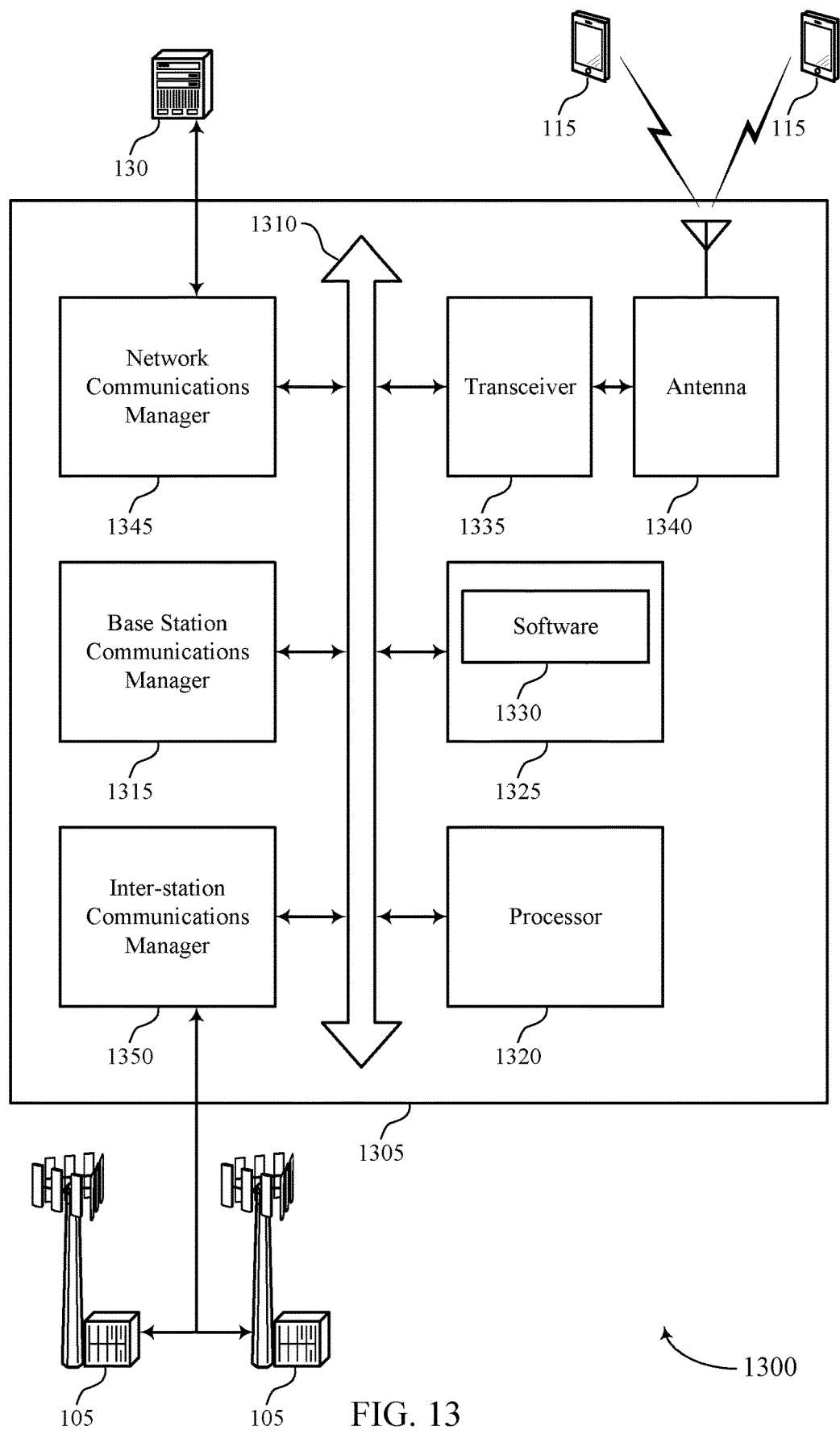
FIG. 13 illustrates a block diagram of a system including a base station that supports feedback bit reservation for uplink control piggybacking in accordance with aspects of the present disclosure.

FIG. 13 shows a diagram of a system 1300 including a device 1305 that supports feedback bit reservation for uplink control piggybacking in accordance with aspects of the present disclosure. Device 1305 may be an example of or include the components of base station 105 as described above, e.g., with reference to FIG. 1. Device 1305 may include components for bi-directional voice and data communications including components for transmitting and receiving communications, including base station communications manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting feedback bit reservation for uplink control piggybacking).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support feedback bit reservation for uplink control piggybacking. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base station 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an LTE/LTE-A wireless communication network technology to provide communication between base stations 105.

Figure 14:
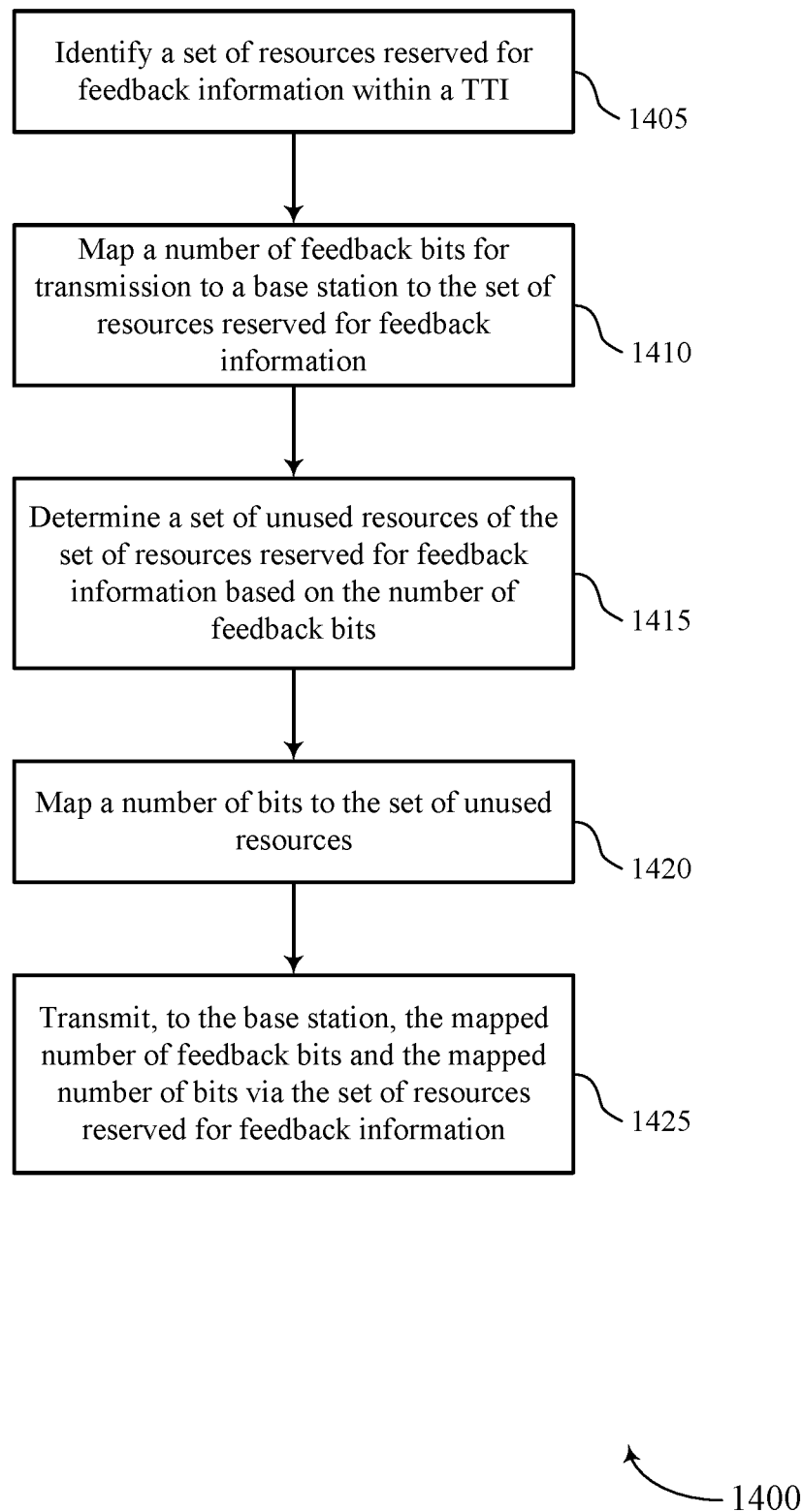
FIGS. 14 through 18 illustrate methods for feedback bit reservation for uplink control piggybacking in accordance with aspects of the present disclosure.

FIG. 14 shows a flowchart illustrating a method 1400 for feedback bit reservation for uplink control piggybacking in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1405 the UE 115 may identify a set of resources reserved for feedback information within a TTI. The operations of 1405 may be performed according to the methods described herein. In certain examples, aspects of the operations of 1405 may be performed by a reservation component as described with reference to FIGS. 6 through 9.

At 1410 the UE 115 may map a number of feedback bits for transmission to a base station to the set of resources reserved for feedback information. The operations of 1410 may be performed according to the methods described herein. In certain examples, aspects of the operations of 1410 may be performed by a feedback mapper as described with reference to FIGS. 6 through 9.

At 1415 the UE 115 may determine a set of unused resources of the set of resources reserved for feedback information based at least in part on the number of feedback bits. The operations of 1415 may be performed according to the methods described herein. In certain examples, aspects of the operations of 1415 may be performed by a unused resources component as described with reference to FIGS. 6 through 9.

At 1420 the UE 115 may map a number of bits to the set of unused resources. The operations of 1420 may be performed according to the methods described herein. In certain examples, aspects of the operations of 1420 may be performed by a bit mapper as described with reference to FIGS. 6 through 9.

At 1425 the UE 115 may transmit, to the base station, the mapped number of feedback bits and the mapped number of bits via the set of resources reserved for feedback information. The operations of 1425 may be performed according to the methods described herein. In certain examples, aspects of the operations of 1425 may be performed by a transmission component as described with reference to FIGS. 6 through 9.

Figure 15:
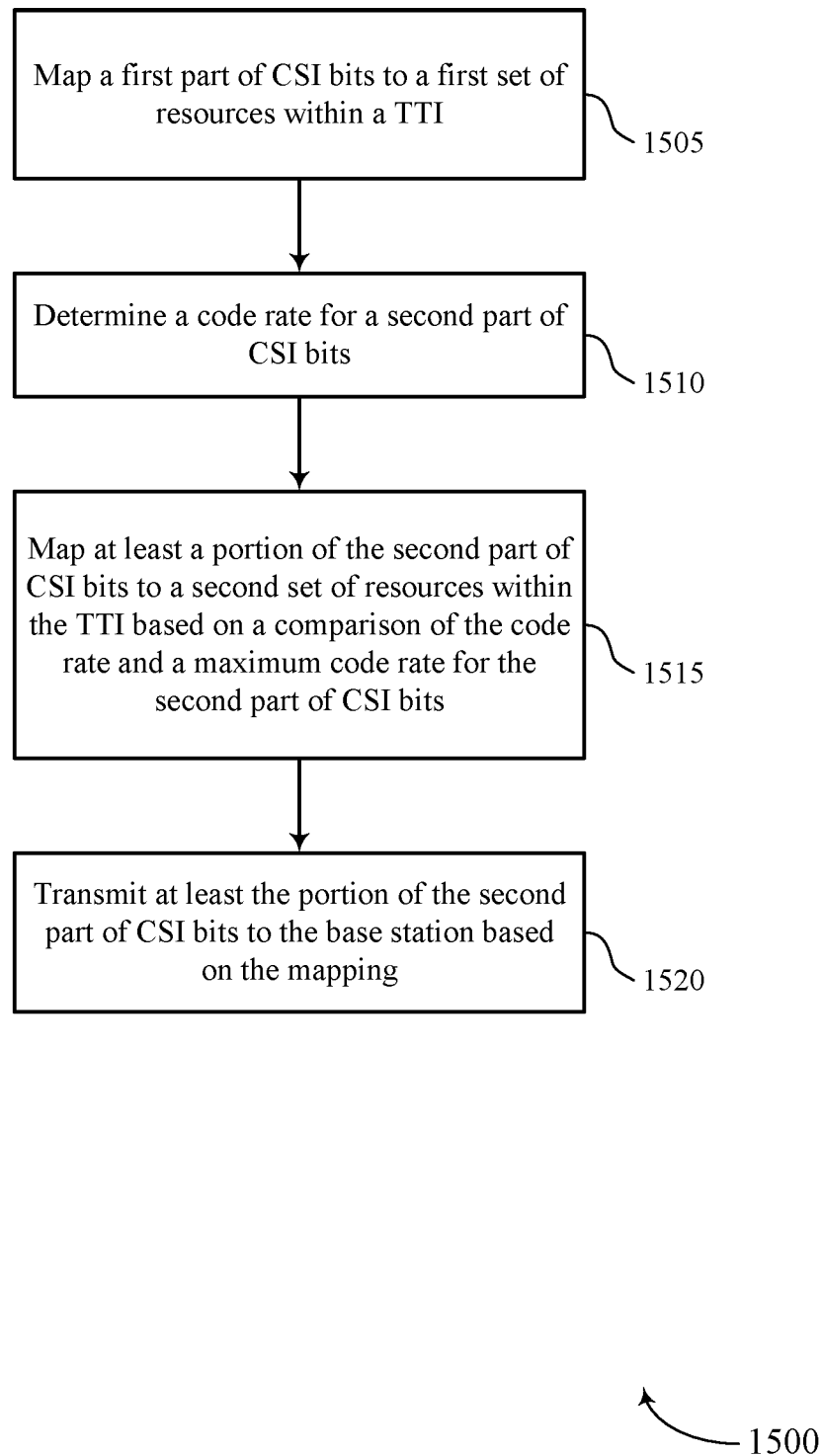

FIG. 15 shows a flowchart illustrating a method 1500 for feedback bit reservation for uplink control piggybacking in accordance with aspects of the present disclosure. The operations of method 1500 may be implemented by a UE 115 or its components as described herein. For example, the operations of method 1500 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may map a first part of CSI bits to a first set of resources within a TTI. The operations of 1505 may be performed according to the methods described herein. In certain examples, aspects of the operations of 1505 may be performed by a bit mapper as described with reference to FIGS. 6 through 9.

At 1510 the UE 115 may determine a code rate for a second part of CSI bits. The operations of 1510 may be performed according to the methods described herein. In certain examples, aspects of the operations of 1510 may be performed by a encoder as described with reference to FIGS. 6 through 9.

At 1515 the UE 115 may map at least a portion of the second part of CSI bits to a second set of resources within the TTI based at least in part on a comparison of the code rate and a maximum code rate for the second part of CSI bits. The operations of 1515 may be performed according to the methods described herein. In certain examples, aspects of the operations of 1515 may be performed by a bit mapper as described with reference to FIGS. 6 through 9.

At 1520 the UE 115 may transmit at least the portion of the second part of CSI bits to the base station based at least in part on the mapping. The operations of 1520 may be performed according to the methods described herein. In certain examples, aspects of the operations of 1520 may be performed by a transmission component as described with reference to FIGS. 6 through 9.

Figure 16:
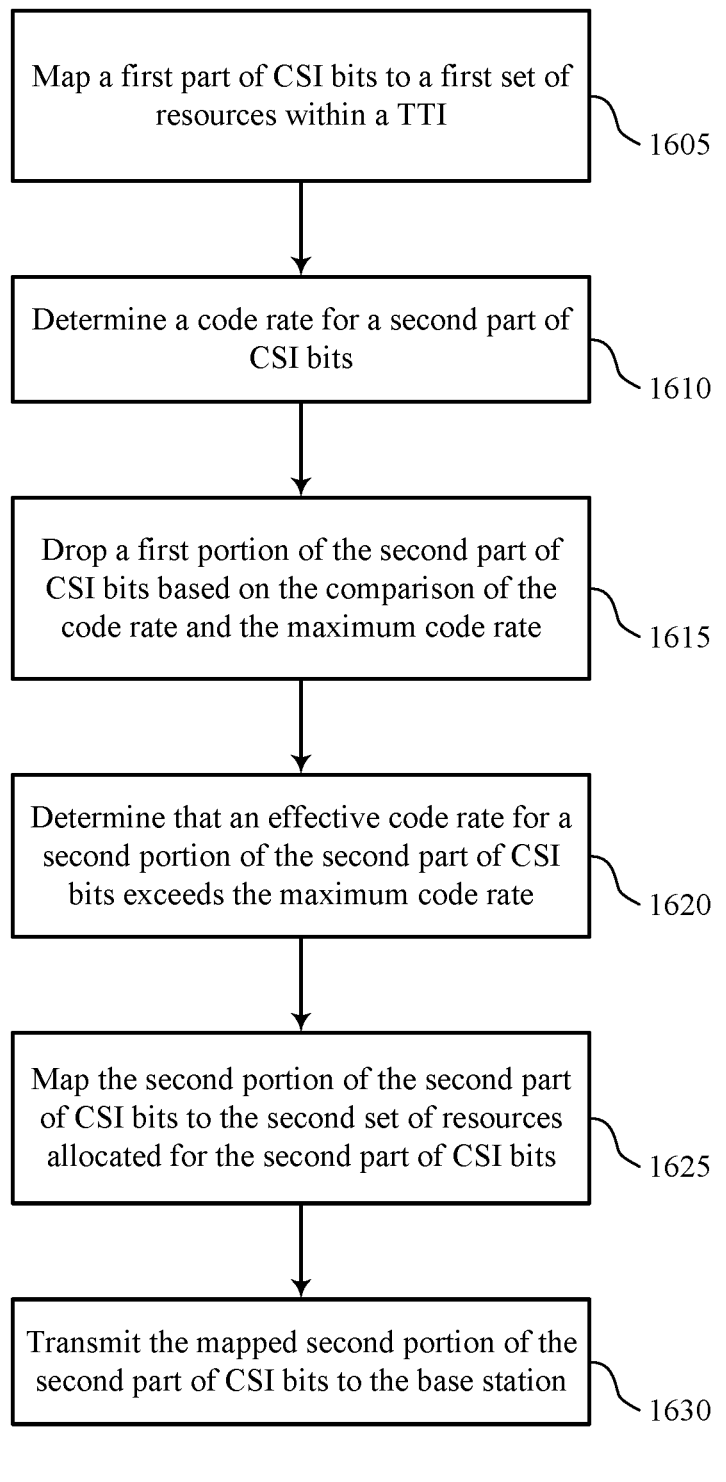

FIG. 16 shows a flowchart illustrating a method 1600 for feedback bit reservation for uplink control piggybacking in accordance with aspects of the present disclosure. The operations of method 1600 may be implemented by a UE 115 or its components as described herein. For example, the operations of method 1600 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1605 the UE 115 may map a first part of CSI bits to a first set of resources within a TTI. The operations of 1605 may be performed according to the methods described herein. In certain examples, aspects of the operations of 1605 may be performed by a bit mapper as described with reference to FIGS. 6 through 9.

At 1610 the UE 115 may determine a code rate for a second part of CSI bits. The operations of 1610 may be performed according to the methods described herein. In certain examples, aspects of the operations of 1610 may be performed by a encoder as described with reference to FIGS. 6 through 9.

At 1615 the UE 115 may drop a first portion of the second part of CSI bits based at least in part on the comparison of the code rate and the maximum code rate. The operations of 1615 may be performed according to the methods described herein. In certain examples, aspects of the operations of 1615 may be performed by a encoder as described with reference to FIGS. 6 through 9.

At 1620 the UE 115 may determine that an effective code rate for a second portion of the second part of CSI bits exceeds the maximum code rate. The operations of 1620 may be performed according to the methods described herein. In certain examples, aspects of the operations of 1620 may be performed by a encoder as described with reference to FIGS. 6 through 9.

At 1625 the UE 115 may map the second portion of the second part of CSI bits to the second set of resources allocated for the second part of CSI bits. The operations of 1625 may be performed according to the methods described herein. In certain examples, aspects of the operations of 1625 may be performed by a bit mapper as described with reference to FIGS. 6 through 9.

At 1630 the UE 115 may transmit the mapped second portion of the second part of CSI bits to the base station. The operations of 1630 may be performed according to the methods described herein. In certain examples, aspects of the operations of 1630 may be performed by a transmission component as described with reference to FIGS. 6 through 9.

Figure 17:
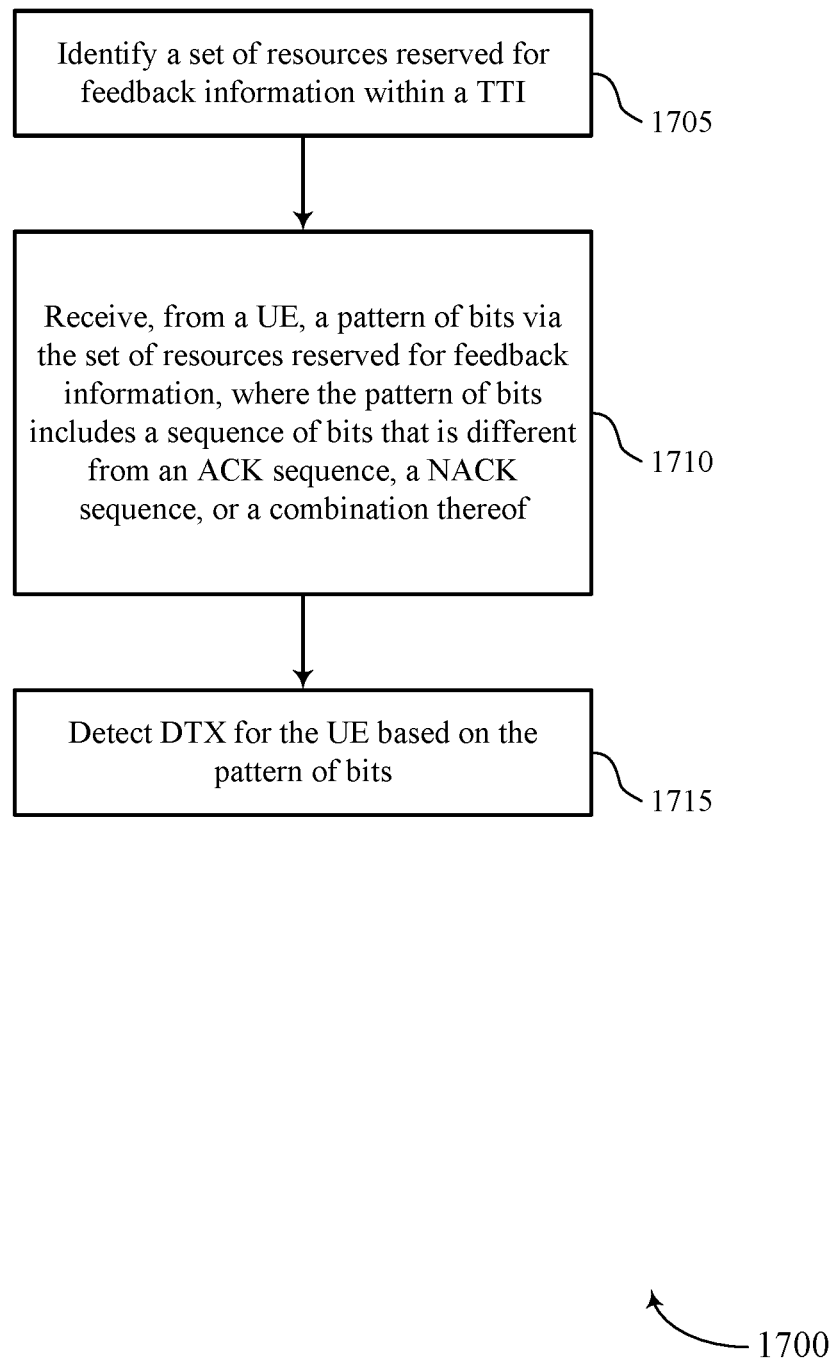

FIG. 17 shows a flowchart illustrating a method 1700 for feedback bit reservation for uplink control piggybacking in accordance with aspects of the present disclosure. The operations of method 1700 may be implemented by a base station 105 or its components as described herein. For example, the operations of method 1700 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1705 the base station 105 may identify a set of resources reserved for feedback information within a TTI. The operations of 1705 may be performed according to the methods described herein. In certain examples, aspects of the operations of 1705 may be performed by a resource identifier as described with reference to FIGS. 10 through 13.

At 1710 the base station 105 may receive, from a UE, a pattern of bits via the set of resources reserved for feedback information, where the pattern of bits includes a sequence of bits that is different from an ACK sequence, a NACK sequence, or a combination thereof. The operations of 1710 may be performed according to the methods described herein. In certain examples, aspects of the operations of 1710 may be performed by a bit receiver as described with reference to FIGS. 10 through 13.

At 1715 the base station 105 may detect DTX for the UE based at least in part on the pattern of bits. The operations of 1715 may be performed according to the methods described herein. In certain examples, aspects of the operations of 1715 may be performed by a DTX component as described with reference to FIGS. 10 through 13.

Figure 18:
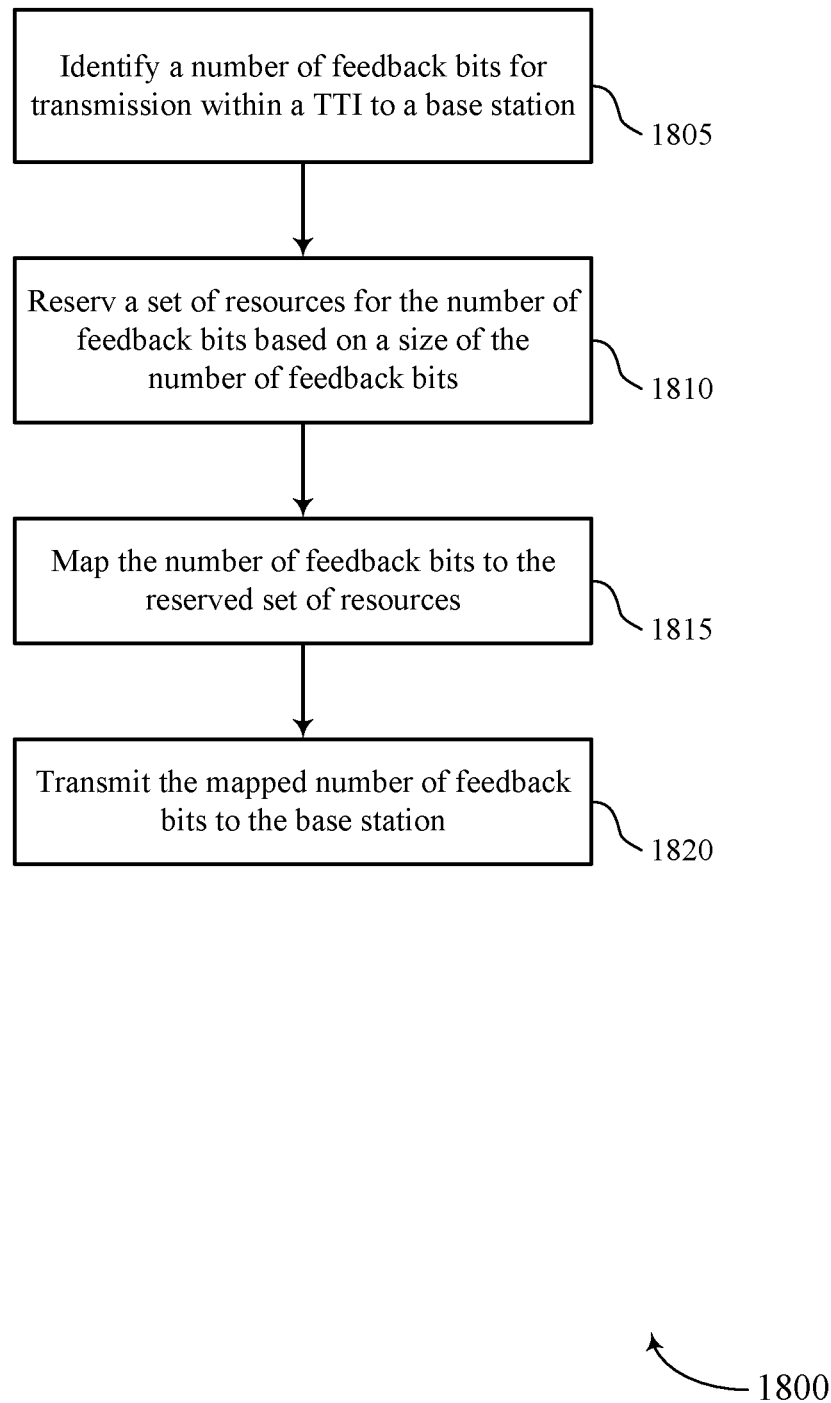

FIG. 18 shows a flowchart illustrating a method 1800 for feedback bit reservation for uplink control piggybacking in accordance with aspects of the present disclosure. The operations of method 1800 may be implemented by a UE 115 or its components as described herein. For example, the operations of method 1800 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1805 the UE 115 may identify a number of feedback bits for transmission within a TTI to a base station. The operations of 1805 may be performed according to the methods described herein. In certain examples, aspects of the operations of 1805 may be performed by a feedback identifier as described with reference to FIGS. 6 through 9.

At 1810 the UE 115 may reserve a set of resources for the number of feedback bits based at least in part on a size of the number of feedback bits. The operations of 1810 may be performed according to the methods described herein. In certain examples, aspects of the operations of 1810 may be performed by a reservation component as described with reference to FIGS. 6 through 9.

At 1815 the UE 115 may map the number of feedback bits to the reserved set of resources. The operations of 1815 may be performed according to the methods described herein. In certain examples, aspects of the operations of 1815 may be performed by a feedback mapper as described with reference to FIGS. 6 through 9.

At 1820 the UE 115 may transmit the mapped number of feedback bits to the base station. The operations of 1820 may be performed according to the methods described herein. In certain examples, aspects of the operations of 1820 may be performed by a transmission component as described with reference to FIGS. 6 through 9.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples.

A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
   identifying a set of resources reserved for hybrid automatic repeat request feedback information within a transmission time interval (TTI);
   mapping a number of hybrid automatic repeat request feedback bits for transmission to a base station to the set of resources reserved for hybrid automatic repeat request feedback information;
   determining a set of unused resources of the set of resources reserved for hybrid automatic repeat request feedback information based at least in part on the number of hybrid automatic repeat request feedback bits;
   mapping a number of bits to the set of unused resources, wherein the number of bits comprises a set of digital zeros; and
   transmitting, to the base station via a data channel, the mapped number of hybrid automatic repeat request feedback bits and the mapped number of bits comprising the set of digital zeros via the set of resources reserved for hybrid automatic repeat request feedback information.

2. The method of claim 1, wherein the number of hybrid automatic repeat request feedback bits for transmission to the base station is zero bits.

3. The method of claim 2, wherein mapping the number of bits to the set of unused resources comprises:
   filling the set of unused resources with a set of predetermined digital bits, wherein the set of predetermined digital bits comprises the set of digital zeros.

4. The method of claim 2, wherein the number of bits mapped to the set of unused resources further comprises:
   a set of predetermined digital bits, wherein the set of predetermined digital bits comprises a set of pseudo random bits or a set of known bits.

5. The method of claim 2, further comprising:
   boosting a transmission power of bits mapped around the set of resources reserved for hybrid automatic repeat request feedback information, wherein the transmission power is boosted based at least in part on the set of unused resources.

6. The method of claim 2, wherein the number of bits mapped to the set of unused resources further comprises:
   a set of channel state information (CSI) bits, wherein the set of CSI bits comprises a first part of CSI bits.

7. The method of claim 1, wherein the number of bits mapped to the set of unused resources further comprises:
   a predetermined pattern of bits.

8. The method of claim 7, wherein the predetermined pattern of bits comprises a sequence of bits that is different from an acknowledgement (ACK) sequence, a negative ACK (NACK) sequence, or any combination thereof.

9. The method of claim 8, wherein the sequence is different from each of a one bit ACK sequence, a one bit NACK sequence, a permutation of the one bit ACK sequence and the one bit NACK sequence, a two bit ACK sequence, and a two bit NACK sequence.

10. The method of claim 7, further comprising:
    scrambling the predetermined pattern of bits using a cell-specific identifier;
    wherein the number of bits mapped to the set of unused resources further comprises the scrambled predetermined pattern of bits.

11. The method of claim 7, wherein the predetermined pattern of bits is used for discontinuous transmission (DTX) detection.

12. The method of claim 1, wherein the number of bits mapped to the set of unused resources further comprises:
a random pattern of bits.

13. The method of claim 12, further comprising:
scrambling the random pattern of bits using a cell-specific identifier;
wherein the number of bits mapped to the set of unused resources further comprises the scrambled random pattern of bits.

14. The method of claim 12, wherein the random pattern of bits is used for discontinuous transmission (DTX) detection.

15. The method of claim 1, wherein mapping the number of bits to the set of unused resources comprises:
mapping a first part of channel state information (CSI) bits to the set of unused resources.

16. The method of claim 15, further comprising:
repeating the mapping of the first part of CSI bits to resources around the set of unused resources.

17. The method of claim 15, wherein the first part of CSI bits mapped to the set of unused resources comprises a reduced payload of CSI bits, wherein the reduced payload of CSI bits corresponds to a rank indicator (RI) and a CSI resource indicator (CRI).

18. The method of claim 1, wherein the number of hybrid automatic repeat request feedback bits for transmission to the base station is one bit.

19. The method of claim 18, further comprising:
repeating a set of information feedback bits prior to mapping, wherein the repeated set of information feedback bits are mapped to the set of resources reserved for hybrid automatic repeat request feedback information;
encoding the repeated set of information feedback bits prior to mapping, wherein the repeated set of information feedback bits are encoded based at least in part on a simplex code.

20. The method of claim 18, further comprising:
repeating a set of encoded feedback bits prior to mapping, wherein the repeated set of encoded feedback bits are mapped to the set of resources reserved for hybrid automatic repeat request feedback information;
encoding the number of feedback bits based at least in part on a repetition code; and
rate-matching the encoded number of feedback bits to the set of resources reserved for hybrid automatic repeat request feedback information.

21. The method of claim 18, wherein mapping the number of bits to the set of unused resources comprises:
filling the set of unused resources with a set of predetermined digital bits, wherein the set of predetermined digital bits comprises the set of digital zeros, a set of random bits, or a set of known bits.

22. The method of claim 18, further comprising:
boosting a transmission power of bits mapped around the set of resources reserved for hybrid automatic repeat request feedback information, wherein the transmission power is boosted based at least in part on the set of unused resources;
wherein the number of bits mapped to the set of unused resources further comprises a set of channel state information (CSI) bits, wherein the set of CSI bits comprises a first part of CSI bits.

23. The method of claim 1, further comprising:
receiving, from the base station, a control channel message that comprises a downlink assignment index (DAI), wherein the set of resources reserved for hybrid automatic repeat request feedback information is identified based at least in part on the DAI.

24. The method of claim 1, wherein the set of resources reserved for hybrid automatic repeat request feedback information comprises a set of resource elements (REs) within a symbol of the TTI.

25. A method for wireless communications, comprising:
identifying a set of resources reserved for feedback information within a transmission time interval (TTI);
receiving, from a user equipment (UE), a pattern of bits via the set of resources reserved for feedback information, wherein the pattern of bits comprises a sequence of bits that is different from an acknowledgement (ACK) sequence, a negative ACK (NACK) sequence, or a combination thereof; and
detecting discontinuous transmission (DTX) for the UE based at least in part on the pattern of bits.

26. The method of claim 25, wherein the pattern of bits comprises a predetermined pattern of bits or a random pattern of bits.

27. The method of claim 25, wherein the sequence is different from each of a one bit ACK sequence, a one bit NACK sequence, a permutation of the one bit ACK sequence and the one bit NACK sequence, a two bit ACK sequence, and a two bit NACK sequence.

28. The method of claim 25, further comprising:
transmitting a downlink message to the UE, wherein the pattern of bits is received in response to the downlink message; and
determining a negative acknowledgement (NACK) response to the downlink message based at least in part on the detection of DTX.

29. An apparatus for wireless communications, comprising:
a processor;
memory in electronic communication with the processor; and
instructions stored in the memory and executable by the processor to cause the apparatus to:
identify a set of resources reserved for hybrid automatic repeat request feedback information within a transmission time interval (TTI);
map a number of hybrid automatic repeat request feedback bits for transmission to a base station to the set of resources reserved for hybrid automatic repeat request feedback information;
determine a set of unused resources of the set of resources reserved for hybrid automatic repeat request feedback information based at least in part on the number of hybrid automatic repeat request feedback bits;
map a number of bits to the set of unused resources, wherein the number of bits comprises a set of digital zeros; and
transmit, to the base station via a data channel, the mapped number of hybrid automatic repeat request feedback bits and the mapped number of bits comprising the set of digital zeros via the set of resources reserved for hybrid automatic repeat request feedback information.

30. An apparatus for wireless communications, comprising:
a processor;
memory in electronic communication with the processor; and
instructions stored in the memory and executable by the processor to cause the apparatus to:

identify a set of resources reserved for feedback information within a transmission time interval (TTI);
receive, from a user equipment (UE), a pattern of bits via the set of resources reserved for feedback information, wherein the pattern of bits comprises a sequence of bits that is different from an acknowledgement (ACK) sequence, a negative ACK (NACK) sequence, or a combination thereof; and
detect discontinuous transmission (DTX) for the UE based at least in part on the pattern of bits.

\* \* \* \* \*